United States Patent
Mullen

(10) Patent No.: US 10,179,277 B2
(45) Date of Patent: *Jan. 15, 2019

(54) LOCATION-BASED GAMES AND AUGMENTED REALITY SYSTEMS

(71) Applicant: Jeffrey David Mullen, Pittsburgh, PA (US)

(72) Inventor: Jeffrey David Mullen, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/140,451

(22) Filed: Apr. 27, 2016

(65) Prior Publication Data

US 2017/0050113 A1 Feb. 23, 2017

Related U.S. Application Data

(63) Continuation of application No. 13/973,997, filed on Aug. 22, 2013, now Pat. No. 9,352,216, which is a (Continued)

(51) Int. Cl.
*A63F 13/12* (2006.01)
*A63F 13/00* (2014.01)
*A63F 13/211* (2014.01)
*A63F 13/216* (2014.01)
*A63F 13/25* (2014.01)
(Continued)

(52) U.S. Cl.
CPC ............ *A63F 13/00* (2013.01); *A63F 13/211* (2014.09); *A63F 13/216* (2014.09); *A63F 13/25* (2014.09); *A63F 13/26* (2014.09); *A63F 13/327* (2014.09); *A63F 13/525* (2014.09); *A63F 13/65* (2014.09); *A63F 2300/1062* (2013.01); *A63F 2300/406* (2013.01); *A63F 2300/50* (2013.01); *A63F 2300/5573* (2013.01); *A63F 2300/69* (2013.01); *A63F 2300/8082* (2013.01)

(58) Field of Classification Search
USPC ................................................. 463/1, 31, 32
See application file for complete search history.

(56) References Cited

U.S. PATENT DOCUMENTS 5,662,523 A 9/1997 Yasumaru
5,704,836 A 1/1998 Norton et al.
(Continued)

FOREIGN PATENT DOCUMENTS

WO WO02073287 9/1992

OTHER PUBLICATIONS

Wikipedia, Super Dodge Ball—Wikipedia, the free encyclopedia. Accessed Dec. 14, 2010. http://en.wikipedia.org/wiki/Super_Dodge_Bal.

(Continued)

*Primary Examiner* — Pierre E Elisca

(57) ABSTRACT

Handheld location based games are provided in which a user's physical location correlates to the virtual location of a virtual character on a virtual playfield. Augmented Reality (AR) systems are provided in which video game indicia are overlaid onto a user's physical environment. A landscape detector is provided that may obtain information about the user's landscape, in addition to the user's location, in order to provide overlaying information to an AR head-mounted display and control information to non-user controlled video game characters.

20 Claims, 14 Drawing Sheets

Related U.S. Application Data continuation of application No. 11/281,812, filed on Nov. 16, 2005, now Pat. No. 8,585,476.

(60) Provisional application No. 60/628,475, filed on Nov. 16, 2004.

(51) Int. Cl.
*A63F 13/327* (2014.01)
*A63F 13/525* (2014.01)
*A63F 13/65* (2014.01)
*A63F 13/26* (2014.01)

(56) References Cited

U.S. PATENT DOCUMENTS

| | | | |
|---|---|---|---|
| 5,717,414 A | 2/1998 | Bergsneider | |
| 5,724,660 A | 3/1998 | Kauser | |
| 5,741,182 A | 4/1998 | Lipps et al. | |
| 5,802,274 A | 9/1998 | Dorak et al. | |
| 5,815,411 A | 9/1998 | Ellenby et al. | |
| 5,902,343 A | 5/1999 | Hale et al. | |
| 5,913,727 A | 6/1999 | Ahdoot | |
| 6,011,653 A | 1/2000 | Karasawa | |
| 6,015,344 A | 1/2000 | Kelly et al. | |
| 6,080,063 A | 6/2000 | Khosla | |
| 6,102,802 A | 8/2000 | Armstrong | |
| 6,106,397 A | 8/2000 | Phillips | |
| 6,106,399 A | 8/2000 | Baker et al. | |
| 6,184,857 B1 | 2/2001 | Latham | |
| 6,270,414 B2 | 8/2001 | Roelofs | |
| 6,287,200 B1 | 9/2001 | Sharma | |
| 6,320,495 B1 | 11/2001 | Sporgis | |
| 6,337,668 B1 | 1/2002 | Berstis | |
| 6,346,929 B1 * | 2/2002 | Fukushima | G06F 3/013 345/156 |
| 6,351,261 B1 | 2/2002 | Reichien | |
| 6,361,438 B1 | 3/2002 | Morihira | |
| 6,378,390 B2 | 4/2002 | Saito | |
| 6,411,266 B1 | 6/2002 | Maguire | |
| 6,520,853 B2 | 2/2003 | Suzuki | |
| 6,522,312 B2 | 2/2003 | Ohshima et al. | |
| 6,530,841 B2 | 3/2003 | Bull et al. | |
| 6,611,242 B1 | 8/2003 | Hongo | |
| 6,625,299 B1 | 9/2003 | Meisner et al. | |
| 6,633,267 B2 | 10/2003 | Numa | |
| 6,633,304 B2 | 10/2003 | Anabuki et al. | |
| 6,663,105 B1 | 12/2003 | Sullivan | |
| 6,685,566 B2 | 2/2004 | Ohshima | |
| 6,690,947 B1 | 2/2004 | Tom | |
| 6,720,949 B1 | 4/2004 | Pryor | |
| 6,735,435 B2 | 5/2004 | Newell et al. | |
| 6,752,720 B1 | 6/2004 | Clapper et al. | |
| 6,756,882 B2 | 6/2004 | Benes et al. | |
| 6,765,567 B1 | 7/2004 | Roberson et al. | |
| 6,822,643 B2 | 11/2004 | Matsui et al. | |
| 6,853,935 B2 | 2/2005 | Satoh | |
| 6,908,392 B2 | 6/2005 | Friedman | |
| 6,951,515 B2 * | 10/2005 | Ohshima | A63F 13/10 463/31 |
| 6,961,055 B2 | 11/2005 | Doak et al. | |
| 6,972,734 B1 | 12/2005 | Ohshima et al. | |
| 6,989,831 B2 | 1/2006 | Ebersole et al. | |
| 7,008,323 B1 | 3/2006 | Hayashi | |
| 7,038,699 B2 | 5/2006 | Sato et al. | |
| 7,050,078 B2 | 5/2006 | Dempski | |
| 7,055,101 B2 | 5/2006 | Abott et al. | |
| 7,056,216 B2 | 6/2006 | Ohshima | |
| 7,084,887 B1 | 8/2006 | Sato | |
| 7,113,151 B2 | 9/2006 | Kinebuchi | |
| 7,250,835 B2 | 7/2007 | Kubota | |
| 7,289,130 B1 | 10/2007 | Satch et al. | |
| 7,303,474 B2 | 12/2007 | Anserson et al. | |
| 7,312,795 B2 | 12/2007 | Aso et al. | |
| 7,321,785 B2 | 1/2008 | Harris | |
| 7,321,682 B2 | 2/2008 | Tooyama | |
| 7,371,163 B1 | 5/2008 | Best | |
| 7,427,996 B2 | 9/2008 | Yonezawa et al. | |
| 2001/0006908 A1 | 7/2001 | Fujioka et al. | |
| 2001/0040591 A1 | 11/2001 | Abbott | |
| 2001/0054019 A1 | 12/2001 | ae Fabrega | |
| 2002/0052933 A1 | 5/2002 | Leonhard et al. | |
| 2002/0061741 A1 | 5/2002 | Leung et al. | |
| 2002/0070916 A1 | 6/2002 | Noro et al. | |
| 2002/0075286 A1 | 6/2002 | Yonezawa et al. | |
| 2002/0082068 A1 | 6/2002 | Singhal | |
| 2002/0082082 A1 | 6/2002 | Stamper et al. | |
| 2002/0090985 A1 | 7/2002 | Tochner et al. | |
| 2002/0131404 A1 | 9/2002 | Mehta et al. | |
| 2002/0198055 A1 | 12/2002 | Bull et al. | |
| 2003/0062675 A1 | 4/2003 | Noro et al. | |
| 2003/0144047 A1 | 7/2003 | Sprogis | |
| 2003/0210228 A1 | 11/2003 | Ebersole et al. | |
| 2003/0224855 A1 | 12/2003 | Cunningham | |
| 2004/0046655 A1 | 3/2004 | Benes | |
| 2004/0056870 A1 | 3/2004 | Shimoyama | |
| 2004/0058732 A1 | 3/2004 | Piccionelli | |
| 2004/0128250 A1 | 7/2004 | Fox et al. | |
| 2004/0248653 A1 | 12/2004 | Barros | |
| 2005/0009608 A1 | 1/2005 | Robarts et al. | |
| 2005/0049022 A1 | 3/2005 | Mullen | |
| 2006/0017654 A1 | 1/2006 | Romo | |
| 2006/0105838 A1 | 5/2006 | Mullen | |
| 2006/0148490 A1 | 7/2006 | Bates | |
| 2006/0154710 A1 | 7/2006 | Serafat | |
| 2006/0258420 A1 | 11/2006 | Mullen | |
| 2007/0281765 A1 | 12/2007 | Mullen | |
| 2007/0281766 A1 | 12/2007 | Mullen | |
| 2008/0015018 A1 | 1/2008 | Mullen | |
| 2008/0015024 A1 | 1/2008 | Mullen | |

OTHER PUBLICATIONS

GameFAQs: Super Dodge Ball (NES) FAQ/Walkthrough by TOKADasrik. Accessed Dec. 14, 2010. http://www.gamefaqs.com/nes/587662-super-dodge-ball/faqs/34823.

Youtube.com Screenshot of Super Dodge Ball Walkthrough with Commentary (Part 1 of 2). Accessed: Dec. 14, 2010. http://www.youtube.com/watch?v=E1IUWmr65JA.

"First Person Indoor/outdoor Augmented Reality Application: ARQuake," written by Thomas et al, and published Feb. 2002.

Quake Game Manual, Release circa 1996.

Antti Kotanen, Marko Hannikainen, Helena Leppakoski, Hamalainen "Experiments on Local Positioning with Bluetooth" Proceedings of the International Conference on Information Technology: Computers and Communications (ITCC '03) Apr. 2003.

Mortal Kombat instruction booklet for Super Nintendo, 1992, Licensed from Midway.

Mortal Kombat 4 (released Oct. 15, 1997). Published by Midway Games <http://en.wikipedia.org/w/index.php?title=Mortal_Kombat_4&printable=yes>.

* cited by examiner

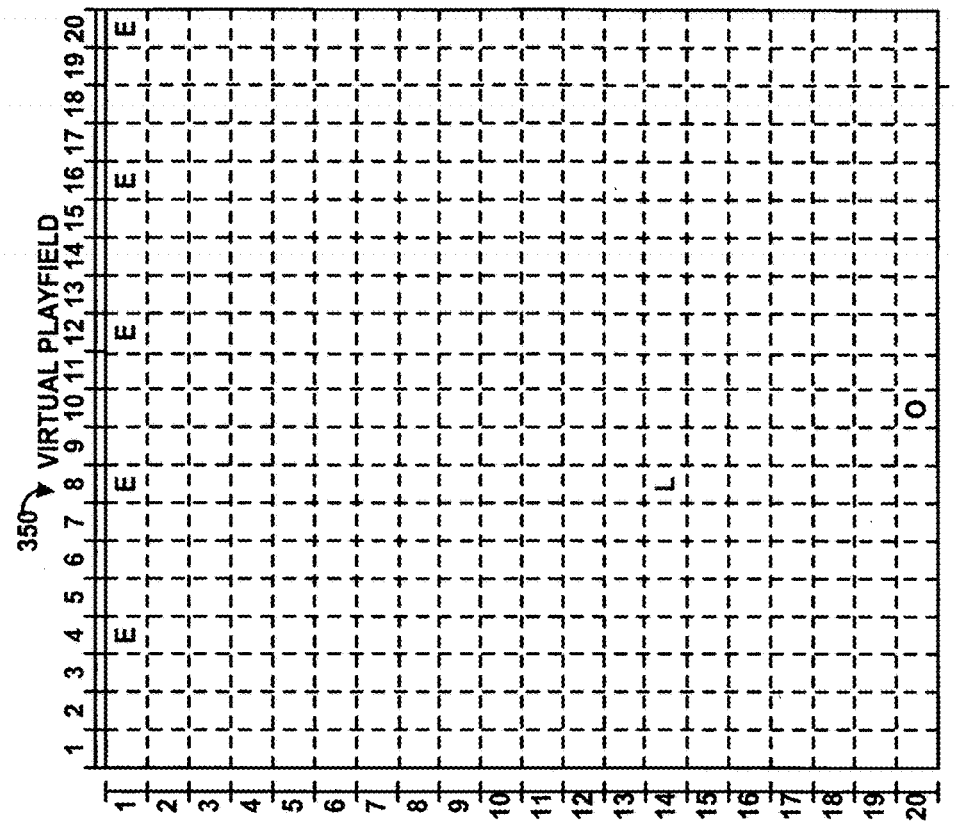
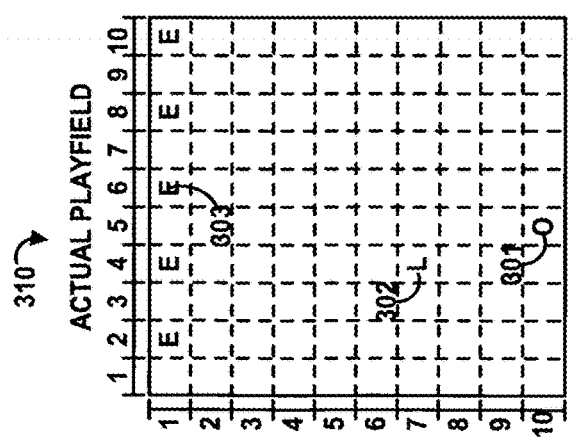
FIG. 3

FIG. 12

LOCATION-BASED GAMES AND AUGMENTED REALITY SYSTEMS

CROSS-REFERENCE TO RELATED APPLICATIONS

This application is a continuation of U.S. patent application Ser. No. 13/973,997, filed on Aug. 22, 2013, which is a continuation of U.S. patent application Ser. No. 11/281,812, filed on Aug. 16, 2005, which claims the benefit of U.S. Provisional Patent Application No. 60/628,475 filed on Aug. 16, 2004 and titled "Location-Based Games and Augmented Reality Systems," which are all hereby incorporated by reference herein in their entirety.

BACKGROUND OF THE INVENTION

This invention relates to location-based game systems.

Virtual Reality (VR) systems have been developed in which a user is provided with a non-transparent head-mounted display. This display provides images to the user such that the user is immersed in a virtual, alternate reality. A user cannot see his/her physical environment while immersed in such a virtual, alternate reality. Accordingly, VR systems are deficient because a user cannot easily move around a physical environment while immersed in the virtual reality because a user cannot see his/her physical environment. If a user begins to physically move in his/her physical environment without being able to see his/her physical environment then the user may trip, or bump into, a physical object (e.g., a rock or chair).

As a result of the mobility constraints of traditional VR systems, a user is traditionally placed on a platform that is surrounded by padded safety rails. A user cannot move outside of this protected platform and moves through the virtual, alternate reality created by the VR system through the use of a manual joystick. Such a VR system is deficient because it severely limits the way that a user may interact with the virtual, alternate reality provided by the VR system.

Traditional manual controls occasionally have a primary control and a number of supplemental controls. Such a primary control occasionally takes the form of a joystick. The primary control occasionally provides the main control signal to a video game. Traditionally, the main control signal controls the location of a video game character in a virtual world. Such controls, however, are deficient because the controls require unnatural user movement to generate the primary control signal. It is therefore desirable to provide a primary control device that does not require unnatural user movement to generate a primary control signal to a video game.

SUMMARY OF THE INVENTION

A handheld location-based game system is provided in which a user's physical position on a physical playfield (e.g., the physical world, a physical environment, or a defined physical playfield) correlates to a video game character's location in a virtual playfield. In this manner, a video game character may be controlled without the need for a joystick. A handheld location-based game system is also provided that includes manual controls. Such manual controls may be utilized during location-based gameplay. An Augmented Realty (AR) game system may also be provided as, for example, a location-based game system and may display virtual indicia on a semi-transparent head-mounted display such that a user can see both virtual indicia and his/her physical environment. Virtual indicia may also be provided that interacts with a physical environment. For example, information may be provided to an AR game system about a user's physical environment. Furthering this example, the location of a doorway in a room may be provided to an AR video game such that a virtual character may be seen by a user of an AR display to walk through a doorway and disappear. Thus, a video game system may be provided that augments a user's environment to provide a video game. As the video game progresses, the user may interact with his/her physical environment in order to play a virtual game (e.g., by walking through his/her environment and shooting at virtual ducks flying through the air).

A switch may also provided that allows a user to manually play a location-based game (e.g., an AR game). In this manner, a user may be able to obtain functionality from the location-based game system when the user is not able to move. Such a benefit may be utilized, for example, when the user is a passenger in a moving car or sick in bed.

A location-based game can, however, be provided while a player is in bed or is in a car. For example, a location-based game could be implemented based on the movement of a car such that the movement of the car is translated into a control signal for the game (e.g., the location of a car in a game). Such a video game system may be embedded in a vehicle (e.g., a car). If a car is safely utilized on a large parking lot, a number of games may be realized as location-based games (e.g., as augmented reality games where game graphics are selectively provided on the vehicle's dash/windows). While in bed, a location-based game can be provided by translating small differences in location of the system (or a controller for a system). The system (or a controller to the system) can, for example, be a fishing rod such that the movement of a flick of the system is used to generate a control signal for casting a virtual rod in a virtual video game system.

A playmat is provided that may be packaged with a handheld location-based game system. If the handheld system is dedicated to a single game (e.g., the handheld system is not enabled to download additional games, play additional games, or receive cartridge-based or disc-based games) then the playmat may be representative of that single game. Additionally, such a single game dedicated system (or any system or any controller) may be shaped similar to, for example, the main character of the video game, or any character or characteristic of a video game, in order to increase the whimsical and festive nature of playing the game.

A playmat for a location-based system (e.g., an AR system) may correlate to a particular virtual playfield. Doing so may assist the user in playing the handheld location-based game. Using the classic game of FROGGER as an example, the virtual playfield of FROGGER may be the same for each level (disregarding the types of virtual computer controlled objects used in each level). Thus, a FROGGER playmat may include indicia representative of this virtual playfield. Additional non-playfield indicia may be provided on the playmat to provide additional location-based game information to a user. For example, a "START" circle may be provided on the playmat. Such a "START" circle may correlate to the location where the user can start each level.

In this manner, the location-based game may be configured (e.g., scaled) such that user movements on the playmat playfield correlate to location-based game movements on the virtual playfield. Thus, the location-based game may utilize the knowledge of the origin location (e.g., the START location) and the playmat perimeters (e.g., physical playfield perimeters) to provide a location-based game. Such a playmat may also be beneficial to locating devices that may accumulate errors over time. As such the location-based game and the playmat may be configured to reduce the chance of such accumulation errors. For example, if a locating device accumulates noticeable location errors after 30 seconds of gameplay, each game level may be limited to a particular period of time (e.g., 30 seconds). In configuring the size of the playmat, and appropriately scaling the location-based game to the playmat, the amount of time before noticeable errors accrue can be manipulated. Similarly, the average amount of time before noticeable errors accrue can be determined such that an appropriate time limit for finishing a level can be subsequently determined. Persons skilled in the art will appreciate that a number of location-based systems can be fabricated in which noticeable errors may never accrue. One such example may be a hybrid locating system that uses an inertial positioning system (e.g., any number of accelerometers and/or gyroscopes) to determine location between signals received from a positioning device (e.g., a GPS device).

Taking FROGGER as an example, a user may be given 30 seconds to travel between the "START" location and an "END" location on the playmat. After the user has completed a level (or dies), that user may be instructed to return to the origin position such that the locating device may reset so that the errors accumulated during the last level is removed but the location-based game knows where the user is. Multiple playmats may be packaged together with a location-based game. Playmats that are similar but have different sizes may also be packaged together with a location-based game. Persons skilled in the art will appreciate that a location-based game can measure the exact location of a device (e.g., via a positioning system such as a GPS system) and/or follow the movement of a device to determine changes in movement (e.g., via any number of accelerometers and/or gyroscopes) or a hybrid of different types of sensors.

Playmats may also include holes such that they may be easily pegged into the ground or such that gaming components may be attached to the playmat at particular locations. For example, if the locating device is a local positioning system, positioning transmitters may be positioned at predetermined locations on the playmat (e.g., holes cut into the playmat for receiving the transmitters) to expedite the correct setup of the local positioning systems.

Systems and methods of scaling information from physical playfields to a video game system are also provided. Systems and methods of storing such information are also provided.

A location-based gaming system with a head-mounted display is provided such that video game indicia may be overlaid onto the user's physical playfield. Such a head-mounted display may be transparent such that a user can see through the display in areas where virtual indicia is not displayed. In this manner, the user may travel as fast as he/she wants to without risk of bumping into, or tripping over, a physical object. The display may also be non-transparent. A camera, however, may be provided on, or around, the head-mounted display to capture the physical environment. The physical environment can then be manipulated by a processor such that, for example, virtual indicia (e.g., a video game character or component is added) is added to the physical environment. The combination of the physical environment and virtual indicia can then be displayed to a user on a head-mounted display (or any type of display) such that a user can still see his/her physical environment even with a non-transparent display. As such, a non-transparent video game system is provided that can provide both augmented reality and virtual reality functionalities.

Such overlays may include games in which only video game characters and interactive objects are overlaid onto the physical environment. As a result, the user's physical environment may be structurally kept the same.

To increase the safety of a game that allows for a high-level of user mobility, such video game indicia may be provided with different contrasts (e.g., strength) at different distances from a user such that at least close virtual objects/characters are semi-transparent such that close, physical hazards may be recognized by a user. Similarly, no virtual indicia may be allowed to come within a certain distance of a user (from the user's perspective). Thus, a virtual indicia (e.g., a video game character) may never block a hazardous object that is close to a user.

A landscape detector may be provided with a location-based game system such that information on the physical terrain of the user's physical environment may be utilized by the gaming system. If the locating device is a GPS device (or if the area has already been scanned), landscape information may be retrieved from memory that stores such information.

The information provided by the landscape detector may be utilized, for example, to position where portions of a video game playfield, objects, and characters may be positioned on a display (e.g., on a head-mounted display). Such information may also be used, for example, to control the movement characteristics of computer-controlled video game characters and indicia. A directional device may also be included to determine the direction and/or pitch that the user (e.g., the head-mounted display) is facing. Such information may be utilized to determine the rotation of a users head as well as the user's visual perspective. Thus, the head-mounted display may, in itself, provide control signals to a video game.

To simplify the process of providing an augmented video game system, a video game may be played in the game system in an ever-changing virtual world. Portions of this game, and perspectives of those portions, may be selectively displayed to the user at a particular time. In this manner, the complexity of an augmented reality game may be simplified such that the augmented system renders a non-visible game based on control signals and, for example, portions of this game are selected and provided to a display based on the control signals. Thus, any type of video game hardware, or software, may be utilized and a module may be provided for the image selection process. Such a module can also configure the image to be displayed to a user (e.g., aligned with a user's physical terrain) or another device (e.g., another module) can be utilized to correlate selected indicia on a physical terrain. Such modules can also convert control signals provided by an AR game controller (e.g., head-mounted movement sensors and/or positioning systems) to control signals understood by any game system. As such, a classic 3-Dimensional video game (e.g., Goldeneye 007 or Pacman 3D) can be played on a classic video-game system (e.g., Nintendo 64 or Playstation), yet be provided as an AR game system. This may be accomplished through the use of an add-on module that may, for example, translate control signals communicated between the game system and add-on module, selective images (and audio) from the game system to display on the AR display, and determine how to display the selected images (and audio) on the AR display (and AR sound system).

Such an add-on module can interface via character control interfaces and audio/video outputs on a game system. In such a configuration, the add-on module may receive just static images/sounds. Thus, the add-on module may be provided with information to process the image, determine the location of video game indicia (e.g., a video game enemy) and determine the action of video game indicia (e.g., a video game enemy shooting). Such information may be provided in a look-up table provided on a remote database such that copies of images for a number of, or all of, video game indicia for any particular game can be obtained and compared to the received still images. Thus, the module can determine how video game indicia is being presented in the game such that the video game indicia can be appropriately presented on an AR display. Furthermore, an AR add-on module can be interfaced to the control processor of a game system (or any component of a video game system such as the system's rendering device). Such an interface may, for example, directly skew what is being rendered and how it is being rendered for later use in an AR display. Such an interface may also, for example, monitor the movement and status of video game indicia directly from the video game system (e.g., directly from the processor).

An AR game system may be utilized in many applications. For example, an AR game system may be utilized in the military training of soldiers. To accommodate such an application the landscape of a pre-determined area (e.g., a particular square area of a military based) may be scanned at a point before a game is played. Virtual objects may be generated using this scanned information that correspond to physical objects. Such a process may be utilized when the landscape is being scanned as a game is playing. Thus, the video game system may construct a virtual world similar to the scanned physical world and generate computer-controlled characters (and interactive or impenetrable objects) on the physical world. Such a pre-scanned system may be relatively inexpensive. If the virtual game characters are computer-controlled enemy combatants (or manually controlled characters by instructors at a stationary game device or manually controlled characters by instructors using a location-based game device on a different, location-synched playfield) then military soldiers may be trained in a variety of safe, combat-realistic situations.

The systems and methods of the present invention may be utilized for any type of Augmented Reality (AR) application and is not limited to video games. For example, AR applications for wearable-computers may be provided. In one such application, virtual advertisements can be displayed on a user's head-mounted display to augment these virtual advertisements over the real world. The display of virtual advertisements may be provided to such a wearable computer when the wearable computer reaches a particular location. The virtual advertisements can be displayed within a physical environment based on the characteristics of the physical environment (e.g., displayed in front of you if nobody is walking in front of you or displayed above the heads of people walking in front of you if people are walking in front of you). Similarly, AR-phone calls may be realized such that the image of the person you are calling is displayed in your physical environment (e.g., the person you are having a telephone conversation is displayed as walking besides you or a two-dimensional video is displayed in front of you).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 3 is an illustration of scaling a virtual playfield to a physical playfield constructed in accordance with the principles of the present invention;

Figure 12:
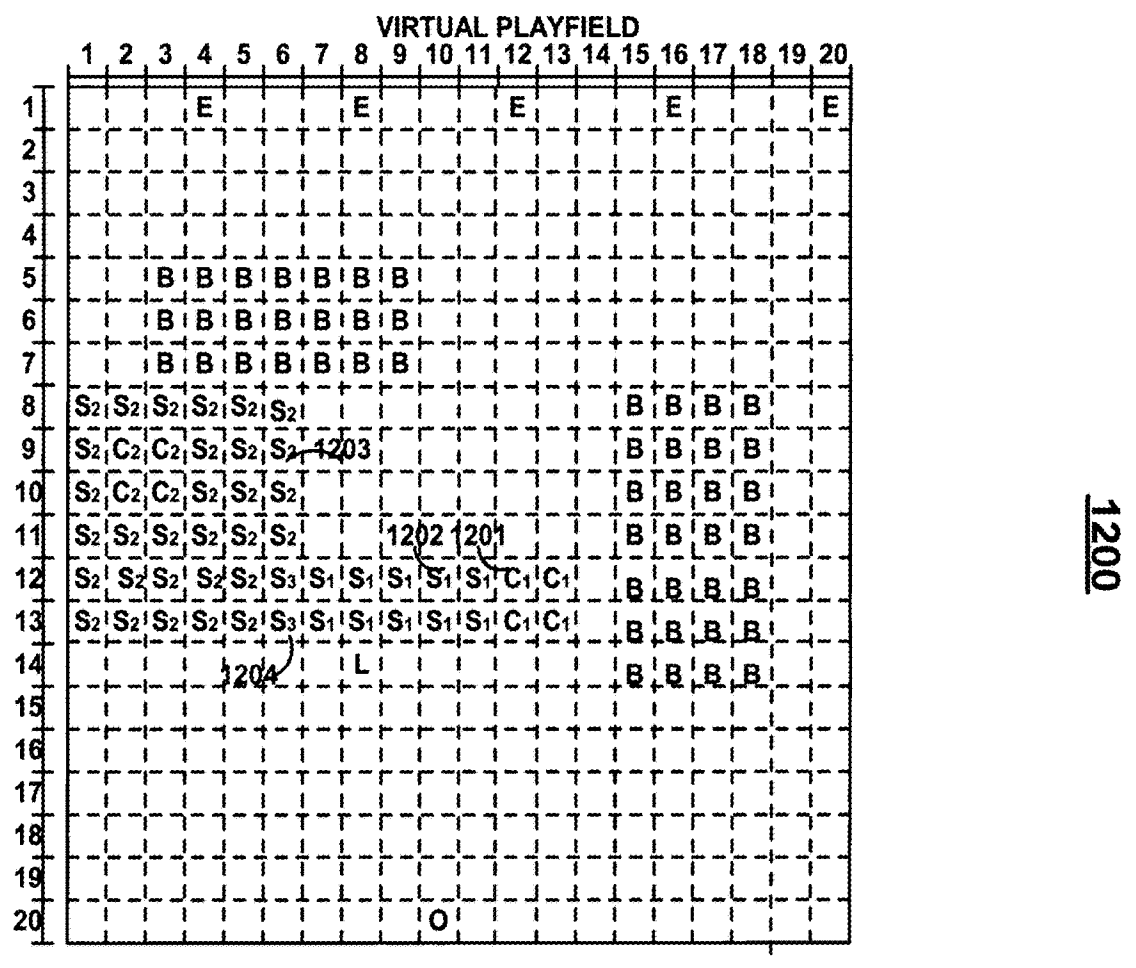

FIG. 12 is an illustration of computer controlled movement of video game characters in a virtual playfield constructed in accordance with the principles of the present invention;

DETAILED DESCRIPTION OF THE DRAWINGS

U.S. Provisional Patent Application No. 60/603,481 filed on Aug. 20, 2004 entitled "Wireless Devices With Flexible Monitors and Keyboards" and U.S. patent application Ser. No. 11/208,943 filed on Aug. 22, 2005 entitled "Wireless Devices With Flexible Monitors and Keyboards" are hereby incorporated by reference herein in their entirety.

U.S. Provisional Patent Application No. 60/560,435 filed on Apr. 7, 2004 entitled "Advanced Cooperative Defensive Military Tactics, Armor, and Systems" and U.S. patent application Ser. No. 11/101,782 filed on Apr. 7, 2005 entitled "Advanced Cooperative Defensive Military Tactics, Armor, and Systems" are hereby incorporated by reference herein in their entirety.

U.S. Provisional Application No. 60/560,435 filed on Sep. 2, 2003 entitled "Systems and Methods for Location Based Games and Employment of the Same on Location Enabled Devices" and U.S. patent application Ser. No. 10/932,536 filed on Sep. 1, 2004 entitled "Systems and Methods for Location-Based Games and Employment of the Same on Location-Enabled Devices" are hereby incorporated by reference herein in their entirety.

U.S. patent application Ser. No. 10/797,801 filed on Mar. 9, 2004 titled "Systems and Methods for Providing Remote Incoming Call Notification for Wireless Telephones" is hereby incorporated by reference herein in its entirety.

U.S. Provisional Patent Application No. 60/367,967 filed on Mar. 25, 2002 entitled "Systems and Methods for Locating Cellular Phones" and U.S. patent application Ser. No. 10/400,296 filed on Mar. 25, 2003 titled "Systems and Methods for Locating Wireless Telephones and Security Measures for the Same" are hereby incorporated by reference herein in their entirety.

Figure 1:
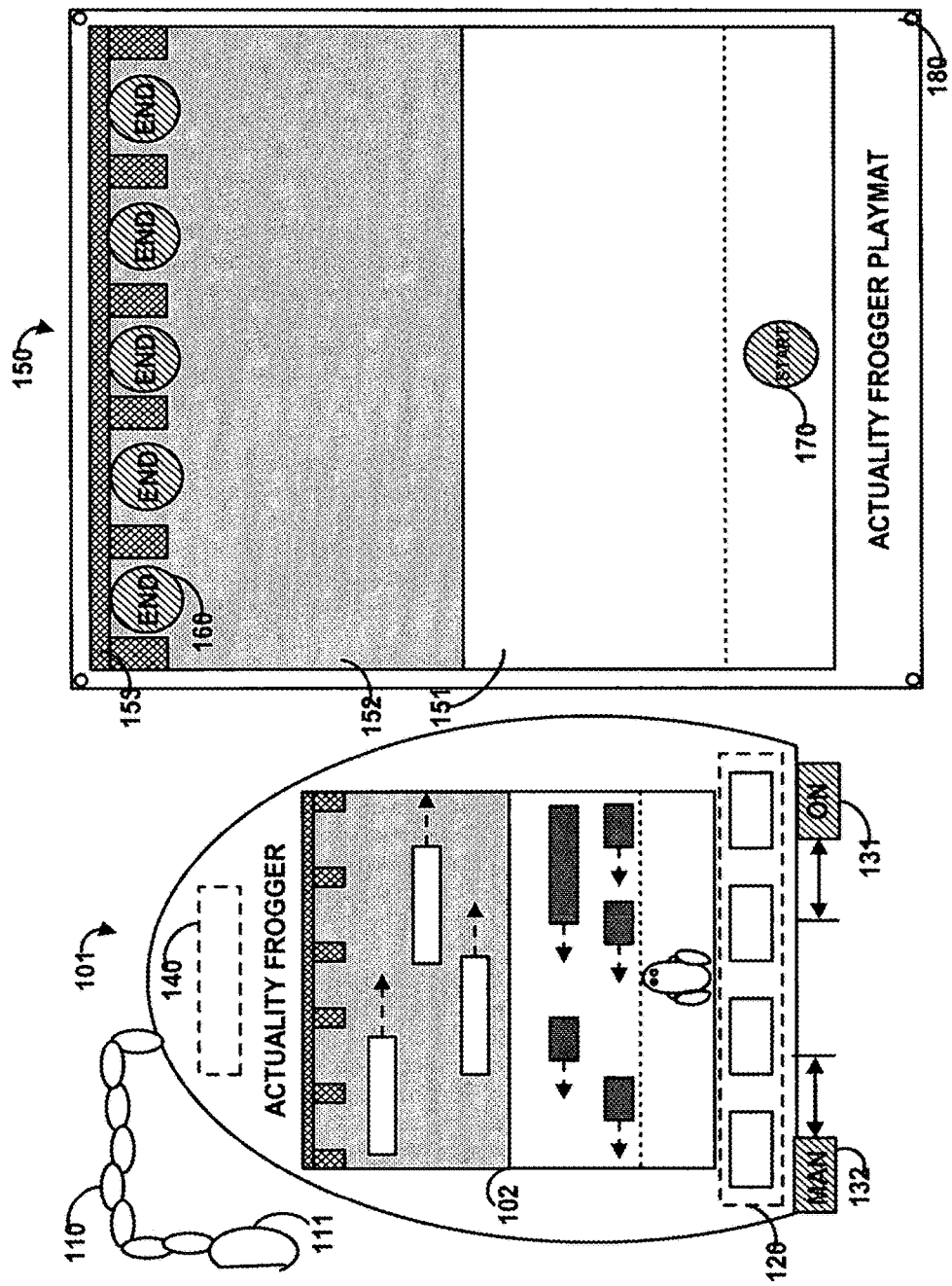
FIG. 1 is an illustration of a handheld location-based game system and accompanying playmat constructed in accordance with the principles of the present invention.

Turning first to FIG. 1, gaming system 100 is provided that includes handheld game system 101 and playmat 150.

Gaming system 100 may be a location-based game system in which the physical location (or physical movement) of a user on a physical playfield determines the virtual location (or virtual movement) of a virtual character on a virtual playfield. Location information may be obtained through, for example, any type of triangulation technique such as a GPS system or a localized positioning system (LPS). For example, the time it takes multiple signals from multiple transmitters to reach device 101 may be utilized to determine the position of device 101. Location information may alternatively be obtained through various cell phone or wireless LAN location techniques. For example, a user's signal strength between multiple hubs or base stations may be utilized to determine that user's location. As per another example, inertial movement sensors such as accelerometers and/or gyroscopes may be utilized to keep track of a user's movement in a particular direction. In this manner, the user's location may be determined and updated based on the user's movements. Hybrids of such systems may also be utilized. For example, an accelerometer may be utilized to keep track of a user's position until a second locating signal is provided (e.g., a GPS system). In this manner, a GPS signal may be the master locating signal while the accelerometer provides location updates between GPS signals. Generally, device 140 is the locating device (or locating devices) for game system 101.

Game system 101 may include manual controls 120 and manual control switch 132 that turns ON and OFF location-based controls. In this manner, a user may still obtain functionality from game system 101 while, for example, sitting on a park bench. ON/OFF switch 131 may control when device 101 is turned ON and OFF.

Persons skilled in the art will appreciate that controls similar to manual controls 120 and 131 may also be provided on an AR game system. Thus, a user may use manual controls to control the location of a video game character in an AR game (e.g., control what first-person perspective is displayed on an AR display) without physically moving. A user may also use manual controls similar to manual controls 120 and 131 to toggle between an AR and VR game, toggle between AR and VR configurations of a game, and toggle from a location-based control scheme to a manual control scheme after an AR game configuration has been toggled to a VR game configuration. Thus, if a user is located in an environment that makes location-based AR gameplay difficult, (e.g., a small-room or in a car), the user can instruct the game system to provide a VR version of the game to be played with a manual controller. Thus, a user may instruct an AR/VR game system to display all virtual indicia on a head-mounted display (and/or render all virtual indicia) and not allow any areas of the display to become transparent. Thus, a user may instruct an AR/VR game system to switch from location-based control to manual input control. For systems with multiple control signals generated from multiple control devices, a switch for alternate control schemes may be provided for each control device. For example, a user may turn a location-based sensor in a head-mounted display off, thus allowing a directional pad on a controller to control the location of a video-game character (a user may also turn a switch associated with the directional pad ON). Yet, the user may decide not turn OFF inertial movement sensors in a hand-held controller, thus deciding not to, for example, use control buttons or a directional pad to replace the functionality of the inertial movement sensors. Thus, a user may still swing around a hand-held controller to register internal sensor readings as control signals to, for example, swing around a video game object (e.g., a sword or lightsaber) in a game (e.g., a VR game) when the user is sitting in a car even though the user could, for example, switch to a directional pad for the control the video game object. Additional examples of a video game object controlled by one or more inertial sensors may include, for example, a fishing rod, tennis racket, baseball bat, pool cue, football (e.g., throwing a football), baseball (e.g., throwing a football), steering wheel, clutch, gun (or another object-projecting device or projectile), horse-racing whip, frisbee, net, boxing gloves, or any type of object or action.

Persons skilled in the art will appreciate that a location-based game system may not require a controller in addition to a game system. For example, game system 101 may be fabricated with just one or more location sensors and/or inertial movement sensors without any additional manual controls. In one example, game system 101 may be a low-cost system that only provides a primary control signal to move a virtual character in a virtual world (e.g., move a frog through an environment). Additional manual controls may be provided on a game system (e.g., controls 120) and a game system may include connection ports to receive additional devices such as additional controllers, other game systems, displays (e.g., a TV or a head-mounted display), memory, add-on modules (e.g., software and/or hardware upgrade modules), or any type of peripheral.

Playmat 120 may be provided in order to increase the whimsical and festive nature of playing game system 101. For example, playmat 120 may include indicia similar to environment indicia in a particular game. Playmat 150 may be sized according to the characteristics of a game, or virtual environment, on system 101. For example, if a game on game system 101 has a water component and a land component, playmat 1450 may have indicia of a water component (e.g., indicia 152) and land component (e.g., indicia 151). The size of each of these components may correspond to the movement needed of device 101 to travel across these components in a virtual environment. For example, if a user has to move 5 feet to cross the land component on a level of a game provided by game system 101 then the land component of playmat 150 may be 5 feet long.

Playmats may be distributed with game system 101 in kits. In this manner, multiple playmats may be included in such a kit (e.g., a retail package) that correspond to different environmental indicia on the game. So, for example, the kit may include a level 1 playmat and a level 2 playmat.

Alternatively, multiple versions of the same playmats may be included of the same level (e.g., have the same type of indicia), but may be fabricated in different sizes. Alternatively a playmat with an adjustable size may be provided. Alternatively still, a playmat may be provided with multiple different play areas (e.g., one half is used for level 1, the second half is used for level two) that can utilize both sides of the mat (e.g., one side is used for level 1, the second side is used for level two). By including different playmats, or by defining different playmat areas, a user may use a different playmat, or playmat area, depending on how much physical movement is needed to move a virtual game character. Control of a virtual game character may be adjustable such that, for example, one mode is provided where a 1 foot movement moves the virtual character 1 pixel while a second mode is provided where a 2 foot movement moves the character 1 pixel. Playmat 150 may include apertures 180 such that playmat 150 may be secured to a surface (e.g., pegged into the ground). Indicia may also be located on the playmat that corresponds to objects in the game. For example, the goal of the game may be included as indicia on a playmat (e.g., indicia 160).

Some game systems may use a reference location such that a user is requested to return to that reference location before playing, for example, a particular level (e.g., the next level after a level has been completed). Such a reference position may also be included as indicia on the playmat (e.g., indicia 170). Game system 101 may include display 102 for displaying a video game (e.g., displaying a 2-dimensional or 3-dimensional image). Location device 140 (e.g., a positioning system and/or inertial movement sensing system) may control the movement of a video game character in a virtual world. The movement of the video game character in the virtual world may be displayed on display 102. Display 102 may be, for example, a transparent display capable of having virtual indicia displayed selective portions of the display. Thus, a user may look down through display 102 and see playmat 150. Any number of virtual indicia may be, in the example of FROGGER, a frog, a number of moving cars and busses, and a number of moving logs). Thus, the static environment of the video game may not need to be displayed on such a transparent display because indicia representative of this static environment may exist on playmat 150. In this manner, a user may look down through a transparent display and see the portion of playmat 150 that is aligned beneath the transparent display. If virtual indicia is supposed to be in the area of the virtual world that corresponds to the area of playmat 150 being viewed through a transparent display of system 101, then that virtual indicia may be appropriately displayed on the transparent display screen. Persons skilled in the art will appreciate that when a user is looking through a transparent display toward ground, the visibility of virtual indicia may be limited. Functionality may be provided in game system 101 such that display 102 is a transparent display that can be held up to a user's eyes. Thus, the direction, the location, and the pitch of game system 101 may, for example, be determined and utilized to determine what, and where, virtual indicia are displayed on such a transparent display.

Persons skilled in the art will appreciate that a head-mounted display (or a display that is held-up to a user's eyes) may be provided with any number of horizontal, vertical, or otherwise aligned two-dimensional images or three-dimensional images. For example, to reduce the complexity of a hand-held game system 101 with the functionality of a hold-to-eye AR system, the virtual indicia may be provided on the display such that the virtual indicia is provided as flat, horizontal two-dimensional images hovering over playmat 150. One advantage of such a two-dimensional example may be that functionally the size of display screen 102 becomes the size of playmat 150 when viewed through display 102 when display 102 is provided as a transparent display operable to display virtual images. Another advantage is that the same processing that is utilized to render a two-dimensional game (e.g., a two-dimensional FROGGER game) may be utilized to render a two-dimensional AR game. Game system 101 may include a clip 111 attached to game system 101 via band 110.

Figure 2:
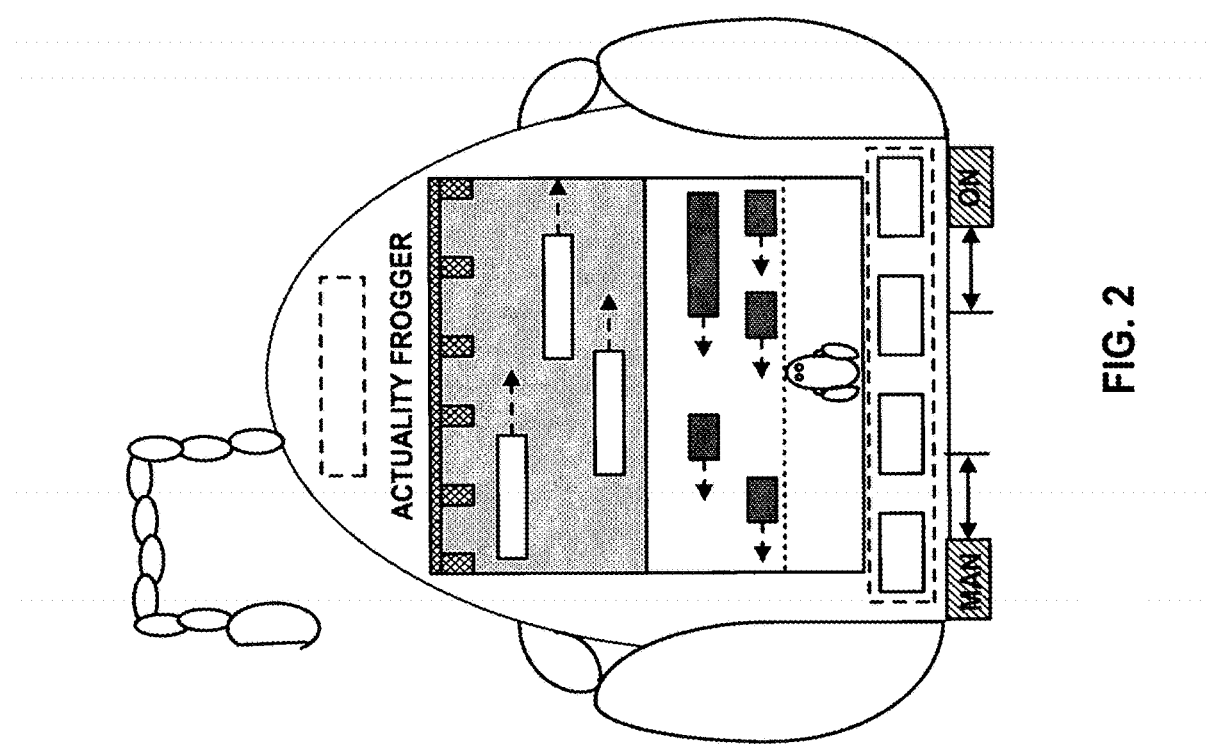
FIG. 2 is an illustration of a handheld location-based game system in the shape of the virtual character that the location-based game system controls constructed in accordance with the principles of the present invention.

FIG. 2 shows handheld game system 200 that is fabricated in a shape similar to a virtual character that a user controls by moving game system 200. As illustrated, game system 200 shows the classic game of FROGGER in which the main character is a frog. Handheld game system 200 is fabricated to resemble a frog, thus adding to the whimsical and festive nature of the functionality of the location-based game. Characteristics other than the shape may be manipulated to increase the whimsical and festive nature of a game system. The paint scheme of the system may, for example, be associated to the colors of a virtual indicia operable of being provided by the game system.

FIG. 3 shows one mapping embodiment in which actual playfield 310 may be scaled to virtual playfield 350. The use of a virtual playfield may be utilized, for example, in systems in which movement scaling is desired. In this manner, a user may be provided with the ability to control how far a particular physical movement (e.g., a 1 foot movement) moves a virtual character (e.g., 1 pixel or 2 pixels). The use of a virtual playfield may also be utilized in systems in which multiple players are on the same virtual playfield. Accordingly, location information may be transmitted directly to a second game device or via an intermediary device such as a database (e.g., a database remote from the multiple game devices). Such a database may push information received from one game device to another game device. Alternatively, the gaming device may periodically, or continually, check the database to see if new information is available or what information is available. In order to share information, such as location information, between two or more gaming devices, a security measure may be provided. For example, the user of one gaming device may request that the user of a second gaming device grant permission for the user of the requesting gaming device to retrieve location information of the requested user's game device from a remote database. The requested user may then use his/her game device to grant permission. Permissions can be granted, for example, for the duration of a particular game between the players, any game between the players for a particular game, any game between the players for any game, a particular length of time (e.g., a day or a week), or a particular time of day (e.g., after-school). Additional parental controls may be provided that allow a third-party to change the permissions of a game device (e.g., such that a child cannot play multiplayer during school hours). The identification of an individual to a game device may, for example, be done via a username and password. A game device may be operable to communicate wirelessly with any number of services. Thus, a parent may go on the internet and contact a server/database that is operable to communicate with a gaming device, identify himself/herself, and change the permissions the child has for using the system. Such a parental control may be operable to prohibit any type of multiple play or games that exceed a particular maturity rating (e.g., a child may be allowed to access everyone games, but not teen or adult games).

A parent, the user, or a third-party, may prohibit play within particular areas or may prohibit game information being sent in particular areas. For example, the manufacturer may prohibit the a game system from sending location information to game systems located in different regions such that U.S. players cannot play against Japanese players. Alternatively, the manufacturer may prohibit a U.S. region game to be played on U.S. region system, or any region system, outside of the U.S. (e.g., in Japan). A game, or game system, may be operable to store a log of game play and a history of where the game device has been located over time. In this manner, games may be fabricated in which the game world corresponds to an actual area of the physical world (such as the planet Earth or New York City). As such, a New York City game may be provided in which you travel New York City playing the game. Accordingly, the game may prompt a player to go to a particular location (e.g., Times Square) to play a mini-game associated to that location (e.g., a Times Square game) in order to obtain a virtual item (e.g., a Times Square T-shirt).

A location-based game (e.g., an AR game) may have its own virtual currency system such that any user can exchange real money for the virtual currency system, with the game manufacturer taking a percentage cut, and the virtual currency can be used to buy/sell items. A user can be provided with the option to then convert the virtual currency back to real currency (e.g., the U.S. dollar) with the game manufacturer again taking a percentage of the conversion. In this manner, a number of advertising schemes may be provided in a video game, or an augmented application, such as an AR video game. For example, an advertiser may buy advertising space at a particular location. A user may view the location at the particular location. If a user enters a physical store, or a virtual store, associated with the advertisements location then the user may be given a portion of the proceeds of the money collected by the advertiser. Alternatively, an advertiser may designate a maximum amount of advertising money the advertiser is willing to spend for a particular amount of time and the amount of money the advertiser is desirous of paying for each entering, or qualified, customer. A qualified customer may be, for example, any user that enters the store with a device operable to display/receive the advertisement, any user whose entrance denotes the first known entrance of that user to a particular location, any user whose entrance denotes the first known entrance of that user to a particular chain of stores (e.g., McDonalds), or any user that interacts with the advertisement before entering the store. When a user is determined to be a qualified a user, a percentage of the advertiser's fee for that qualified user may go to the video game manufacturer (or other third-party such a location-based advertisement service) and a percentage of the advertiser's fee for that qualified user may go to the qualified user. Alternatively, for example, the store that gave up its virtual advertising space (e.g., in an AR game where physical locations in the world are a part of gameplay) may get a percentage (e.g., the qualified user's percentage). Thus, a store can virtually advertise to an AR video game (or another location-based service such as an AR information application run on a wearable computer) where third party advertisements are provided by an advertising service. Each store (or chain of stores) may define a particular type of third-party virtual advertisement to be displayed (e.g., sporting good ads) and, for example, a minimum price per qualified customer that needs to be met to provide the third-party advertisement over a default advertisement chosen by the store (e.g., the stores advertisement).

Location scaling may be advantageously utilized in a number of situations. For example, one player may scale his/her physical movement differently than another player in order to produce a handicap/advantage or to allow for two players to play an AR game that are located on different physical playfields having different sizes. Thus, cousins can play against/with each other in the same virtual environment even though one player is located in a small, fenced-in backyard in Texas while the other player is located in wide, open soccer field in Minnesota.

Information on the actual playfield and virtual playfield may be stored on the memory of a portable device, an intermediary device, or both. Also, information about the actual playfield may be stored on the portable device while the virtual playfield is stored, for example, on an intermediary device. Information about a playfield may include, for example, the parameters of the playfield, scaling information, and the status of the playfield (e.g., where a particular user is located in an actual playfield and where a user is located in a virtual playfield). The information about a playfield may also include where actual objects are located (e.g., the areas of an actual playfield where impenetrable objects such as house or boulder are located). The information about a playfield may also include where virtual objects are located (e.g., the areas of a virtual playfield where a virtual sword or treasure is located).

Additionally, actual playfield data may not be stored at all so that only virtual playfield data is stored (and scaling information to convert the information to information useable on a particular actual playfield). Thus, scaling may be done only at an intermediary device (or other game device) such that the intermediary device (or other game device) scales right before information is transmitted to a game device. Alternatively, scaling may be done at the game system level such that scaled information may be written directly into a virtual playfield (e.g., such that the intermediary device or other game systems do not have any knowledge of how information is scaled). In this manner, a standard type of location information may be used to transmit information between devices. Such a standard may be 10 pixels for 1 foot such that devices only need to transmit data in the standard and the devices themselves can be set to scale the standard location information in any manner without affecting, for example, remote devices. Further still, virtual playfield data may not be stored at all and actual playfield data may be utilized to operate the game. Such playfields may take the form of, for example, a matrix of data, a matrix of vectors, or a matrix of matrices. In one embodiment, each matrix location may correspond to a pixel or a group of pixels (or a location or a group of locations). A user's location (and/or the location of game characters or game objects) may be stored in such matrices and utilized to operate the game.

Suppose a game system is configured such that recognition of movement along actual playfield 310 is recognized by moving through areas that are 1 foot by 1 foot. Suppose a virtual playfield 350 operates under a similar scheme only that the recognition of movement along the virtual playfield is recognized as movement through areas that are 0.5 foot by 0.5 foot area. Gameplay between two players located in two different playfields (both of which could be actual or virtual) may occur by simply transmitting the number of location areas that a particular player has traveled through (e.g., player 1 travels vertically two area locations). Such a number may be scaled such that the user's actual movement of 5 location areas (e.g., 5 feet) is transmitted to the process controlling virtual playfield as 10 location areas (e.g., 10 feet). As stated above, each system and/or intermediary may have its own virtual playfield for a one or multiplayer game. Persons skilled in the art will appreciate that a two player game may be provided on a single game system. Particularly, a number of wireless controllers may be provided. A user can set up how much movement of a controller in an actual world would be required to move a virtual character a particular distance in a virtual world. Thus, a user can control the speed of his/her virtual character compared to other users.

A user therefore may start at origin O (noted on actual playfield 310 as position 10, 5 or information/location 301) and move up 3 feet and to the left 1 foot to be at location L (noted on actual playfield 310 as position 7, 4 or information/location 302). In this manner, data may be stored on a matrix (or other data structure such as a database accessed by a memory pointer) corresponding to an actual playfield location (e.g., matrix location 7, 4). Actual playfield data (such as actual location information) may then be scaled and stored on a second playfield data structure (e.g., as location 14, 8 on a second matrix) such that, for example, a scaling functionality can be provided. Generally, locations on different playfields are scaled according to a relationship between the structure of the two playfields. Multiple types of information can be written to a matrix such as a matrix for a virtual playfield. For example, a player identifier and scaling information may be stored in a matrix location. Persons skilled in the art will appreciate that the location of a user can also be stored in data structures as location information or the location can be determined based on where non-location information is stored in a storage structure (e.g., where in a matrix a players identification information is stored). Information about virtual indicia such as virtual characters and objects may also be stored in such a virtual playfield.

A playfield may also have event data (such as data E at location 1, 6 on playfield 310 or information/location 303). Event data may trigger an action if someone occurs at that event location, in relation to that event location, or in relation to the event data. For example, event data may be configured such that if a user (e.g., a manually controlled virtual character) enters location storing event data E, or location 303, an event occurs (e.g., the level is completed or the game develops in a particular way). As per another example, event data may be configured such that if a user accomplishes a goal (e.g., shoots a rocket-propelled grenade at the location and the rocket-propelled grenade hits, or enters the location, then the event data may change the characteristics of the location such that an impenetrable location becomes an accessible via an access pathway).

A processor may move, operate, the virtual objects in such a virtual playfield according to code representative of the game. Code representative of the game can take account of particular situations such as, when example, a computer-controlled video game character nears, or enters the location of, a player-controlled video game character. The code can use this information and other information (e.g., additional manual control information from a player such as the status of ATTACK and DEFEND buttons) to determine what happens to the manually or computer-controlled game character on the virtual playfield. Thus, the video game can, for example, be executed on the system(s) housing the virtual playfield. If, for example, the virtual playfield is located on a remote system such as a remote database (or a game system remote from head-mounted displays) each separate gaming device, or head-mounted displays, may only need to have the ability to receive and display video/sound representative of the video game environment and send location and control information to the system playing the video-game. Such an embodiment provides light-weight and inexpensive head-mounted displays or game devices and may not need to store an actual playfield. Such devices can transmit location and control information scaled to a standard format (e.g., 0.5 foot movements) as well as other information such as the direction the user is facing, the perspective of the user (e.g., how the user's head is tilted such as the pitch and roll of the head) and the status of any additional buttons. Persons skilled in the art will appreciate that sensors can be utilized to determine the pitch, yaw, or roll of a device such as a head-mounted display and such information may be utilized by an AR game system (e.g., utilized to select and display virtual indicia on a virtual display).

In a dedicated single player game with no scaling capabilities, for example, actual playfield matrix 310 (or a playfield matrix) may be utilized to store location information and operate the game. As a result, the actual playfield matrix 310 may be visualized as a virtual playfield matrix. In this manner, a processor may periodically (or in real time) update the location of game objects or the status of the game (e.g., environment objects, enemy objects, and interactive objects) based on particular characteristics of the game. For example, if, for any period or at any time, a user's location corresponds to the location of an end object (as stored in actual matrix 310) then the game may determine that the game has ended and display associated graphics to the user by way of a display.

In a multiplayer game with two portable systems and a remote intermediary, the intermediary may, for example, utilize playfield matrix 350 to update game locations while the individual systems use different playfield matrices. One portable system may, for example, have a playfield matrix similar to playfield matrix 310. The other portable system may have, for example, a playfield matrix similar to playfield matrix 350. As a result, even though data is handled at a different scale on each portable system, the data is scaled to the same matrix (e.g., the same virtual playfield). Thus, the two portable systems may easily play with each other—even if the two portable systems are using completely different playfields of different sizes (e.g., one player is playing on a basketball court in Japan while a second player is playing in his/her backyard in the USA). Such players may chose an actual playfield dimension from a variety of dimensions (e.g., 10 feet by 10 feet or 20 feet by 20 feet) and information may be stored according to these dimensions and transmitted to an intermediary (e.g., a database stored on a remote database). Information may be transmitted periodically or in real time. Information may be received periodically or in real time (in order to, for example, obtain opponent player information). Transmissions may alternatively occur when information changes. The portable systems may be in charge of transmitting/receiving. The intermediary (or intermediaries) may be in charge of transmitting/receiving. Or, for example, the portable system may be in charge of transmitting information when that portable system's location changes and the intermediary may be in charge of transmitting information (e.g., when the portable system receives information) when the opponent player's (or any one of multiple opponent players) location changes or a game characteristic changes (e.g., the location of a virtual game character not associated to an actual user changes).

Figure 4:
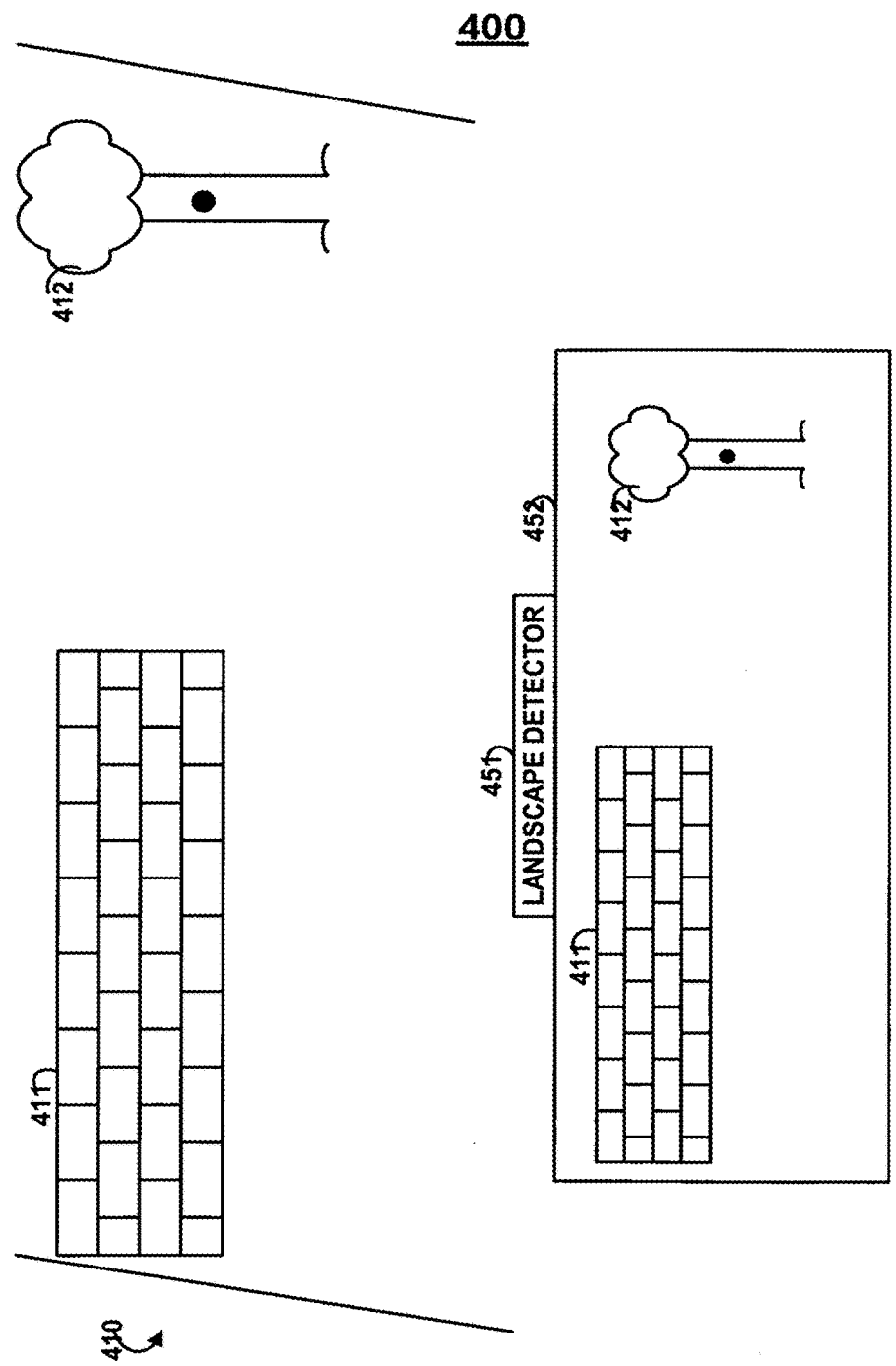
FIG. 4 is an illustration of landscape detection constructed in accordance with the principles of the present invention.
Figure 5:
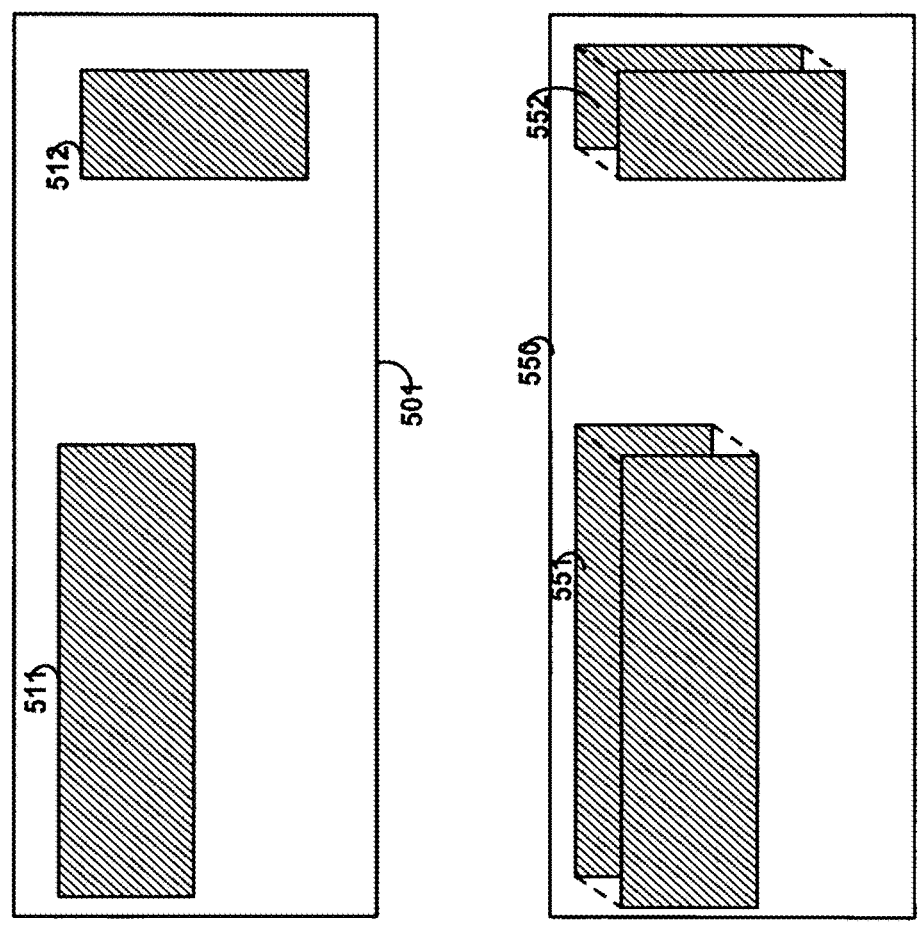
FIG. 5 is an illustration of virtual impenetrable object construction on a playfield based on detected landscape objects constructed in accordance with the principles of the present invention.

FIG. 4 shows semi-visible display 451 in which an AR game is provided. Landscape detector 451 may be provided in such a system such that the location of actual environmental objects may be determined and utilized in the game. In environment 410, environmental objects 411 and 412 are present. Accordingly, landscape detector may determine the location of environmental objects 411 and 412 and record this location in memory (e.g., in a remote or local playfield matrix or data structure). The game may be then utilize such environmental objects to change the characteristics of the game (e.g., where virtual game characters not associated to actual users may move in a virtual environment). Thus, computer-controlled characters may not be able to move into areas with such environmental objects and the movement profiles of a computer-controlled character may change as a result of the environmental object. As such, a default traveling route that a computer-controlled character is coded to travel (or a default behavior that a character is coded with) may be changed due to an environmental object.

Landscape detector 451 may take multiple forms. For example, landscape detector 451 may measure the distance to objects and the shape of the object. This may be done for example by sound/light sensing (e.g., reflective sensing such as sound/light echoing or color sensing with respect to light source) or any type of object/distance sensing (e.g., infrared). A camera may be utilized to take a picture/video of the environment. Video processing features may be utilized to determine landscape as, for example, a user moves around the landscape. Such determined landscape may be stored in the game system (or a remote system) and utilized to determine where to place virtual images on a display (e.g., a head-mounted display) based on the alignment of that display to the actual environment. Landscape sensing may be done throughout game play or at set times (e.g., before a game is started or periodically). Such information may be stored in memory as part of an environment profile and associated with location information such as global information such that the environmental profile may be utilized whenever that user plays in that environment (e.g., at a particular longitude and latitude coordinate).

Alternatively still, environmental data may be coded directly into the game. For example, if the military desires an AR system for special operations warfare then a particular field may be utilized for game play. That particular field may include environmental objects and the location and size of these environmental objects may be coded directly into the system (e.g., on a playfield matrix or data structure). Virtual interfaces may help code such data by allowing a user to, for example, pick shapes and place them on a virtual playfield and manipulate the shapes until they correspond to actual shapes on an actual playfield. In this manner, functionality may also be added to objects. For example, if the object is a house, the object may be coded as hollow and may allow a user to pass through a particular portion of the object (e.g., the portion that correlates to a doorway) but not other portions of the object (e.g., the portion that correlates to wall). Virtual objects generated by a Location-Based (LB) or AR game (or other AR or LB service) that do not correspond to actual objects may operate in a similar manner (such that if a user tries to pass through a wall his/her perspective does not change). This may be an advantage over scanning techniques because scanning techniques may denote the object as solid if the door is closed when scanning occurs.

As a result of system 400, virtual characters may be displayed on display 452 and augmented over reality. Using the above example, computer controlled enemy soldiers may be played in the house and may have the functionality of only being able to move inside of the house (manually controlled enemy soldiers may similarly be restrained from moving out of the house). Therefore, U.S. soldiers using augmented reality system 400 may be able to train with highly skilled virtual combatants in real environments. Such combatants may also be controlled remotely by other users (e.g., instructors) operating in a similarly sized real building on a different field. In this manner, live rounds may be used in a safe environment (if, for example, only 1 person is playing in each actual environment). Sensors may be placed on a physical door to the building to determine whether the door is OPEN or CLOSED. Alternatively, the landscape detector may be configured to recognize open doors or the AR system may determine that an access pathway is available in a real world once a user enters into such an access pathway (e.g., a location the game system things is blocked may be changed to unblocked after a game system moves into the location). Thus, the status of an actual, physical object (e.g., a door) may affect the game. Using the above examples, enemy soldiers may be able to move out of the building once an access pathway is created that leads into the house (e.g., where computer controlled characters, or other indicia can only leave through such access pathways or other exits). Access pathways may also be created in virtual objects not present in the physical, actual world. For example, a virtual house, or other object, may be augmented over a user's environment. If a user tries to pass though the object improperly (e.g., without opening a door or performing another action such as blowing a hole in the virtual object), the user may be able to walk forward in his/her physical environment, but the augmented reality perspective/scene provided to the user may not change. Actions (e.g., solutions) may be stored in the game that, when triggered, create an access pathway in a virtual object. Such an action may be, for example, pressing an OPEN button, or performing an OPEN function, on a virtual door, blowing a hole into a virtual wall via a gun or bomb, placing a virtual key (e.g., a virtual key obtained earlier in a game) near the virtual door or a virtual keyhole associated to a door, properly using an alphanumeric virtual access pad on the alphanumeric door, or getting past a particular stage in the game (e.g., lighting a computer-controlled virtual game character on fire so that the virtual game character crashes through the door).

Device 400 may have any component of a location-base game including, for example, positioning systems (e.g., GPS systems) and movement sensors (e.g., accelerometers and/or gyroscopes). Furthermore, additional sensors may be utilized to determine pitch that the head-mounted display is pointed, the height of the head-mounted display, the roll of the head-mounted display, and the direction that the head-mounted display is pointed. The perspective of virtual game characters may be, for example, determined by such pitch, height, roll, direction, and location information.

FIG. 500 shows virtual environments 501 and 550 that may be rendered using actual environment data may be used in, for example, a location-based game (e.g., an AR game) in a variety of different ways. Persons skilled in the art will appreciate that environments of a figure (e.g., such as environments 501 and 550) may also be considered playfields (e.g., virtual game playfields) or may be virtual indicia (e.g., virtual game objects and characters) augmented over actual, physical environments.

In one methodology, actual, physical objects are scanned in by a landscape detector (or manually entered) may be virtualized as virtual objects in the video game. Thus, information regarding actual, physical environmental objects may be saved on a virtual playfield that stores information for a game such as a game matrix/database or other data structure. Persons skilled in the art will appreciate that such virtual objects may be displayed to a user or may be used only as game information that game code uses to execute a game. In an example where virtual environmental objects are displayed back to a user that has associated physical environmental objects in his/her view, the virtual environmental objects may be augmented to replace, or lay over, the physical, objects. Such a technique may be utilized to provide a more seamless execution of an AR game as virtual characters may be aligned with the virtual objects. Thus, if the game becomes misaligned to the landscape on a display (e.g., a semi-visible head-mounted display), the characters may still be aligned with the virtual environmental objects and the misalignment may not be noticed. Also, physical objects may be recognized as described above, their appearance manipulated, and then used to augment a viewer's perspective of the actual environmental object. For example, suppose a game has a number of immobile, non-hollow objects (e.g., crashed spaceships, dead dinosaurs, gigantic trees), the size of scanned in environmental objects (e.g., houses, boulders, trees) may be compared to the size of the game objects. Objects that are close in size to an environmental objects may be rendered in the location of the actual, physical environmental object until, for example, all of the actual, physical environmental objects have been augmented with environmental game objects. Such a feature may increase the available area of a playfield that a user may walk to. Such a feature may make playing the same game in different playfields appear different as virtual environmental objects are placed differently in the different playfields. Such a difference may result in a difference in the difficulty of the game.

In environment 501, environmental objects 511 and 512 may be virtualized as a 2-D object in a 3-D space. Alternatively, as shown in environment 550, environmental objects 511 and 512 are virtualized as 3-D objects in a 3-D space (e.g., either by 3-D objects or 2-D objects that define the perimeter of the 3-D object. If the environmental sensor can only sense the distance to an object and, for example, the 2-D size of the object then program logic may be provided to generate a 3-D image from the sensed 2-D image. For example, program logic may assume that a 2-foot tall and 2-foot wide 2-D object is 2-feet deep and, in this manner, may determine depth information based on height and width information. Such depth information may be updated as more information is gathered (e.g., as a user walks to a point where the depth of the object may be sensed). Persons skilled in the art will appreciate that two still images of an object taken from different perspectives may be utilized to determine additional dimensions of an object when compared to when only a single image is evaluated. Thus, the information on the actual environment may be ever-changing and utilized continually, or periodically, by the game system.

In another methodology, virtual environmental data may be utilized to display virtual environments on areas of the head-mounted display (or other display). This can provide numerous functionalities. For example, if two players play on different field with different objects, virtual objects from an opponents field may be generated on a user's field such that both opponents have the same type of area to play in. Each user may then not be able to move into environmental objects from other player's environments. Alternatively still, the location of actual environmental objects may determine the placement of, for example, non-interactive and/or impenetrable virtual objects. For example, if an augmented reality game has an item shop, that item shop may be overlaid over a large actual environmental object (e.g., a wall) such that the user's "free space" is maximized.

Figure 6:
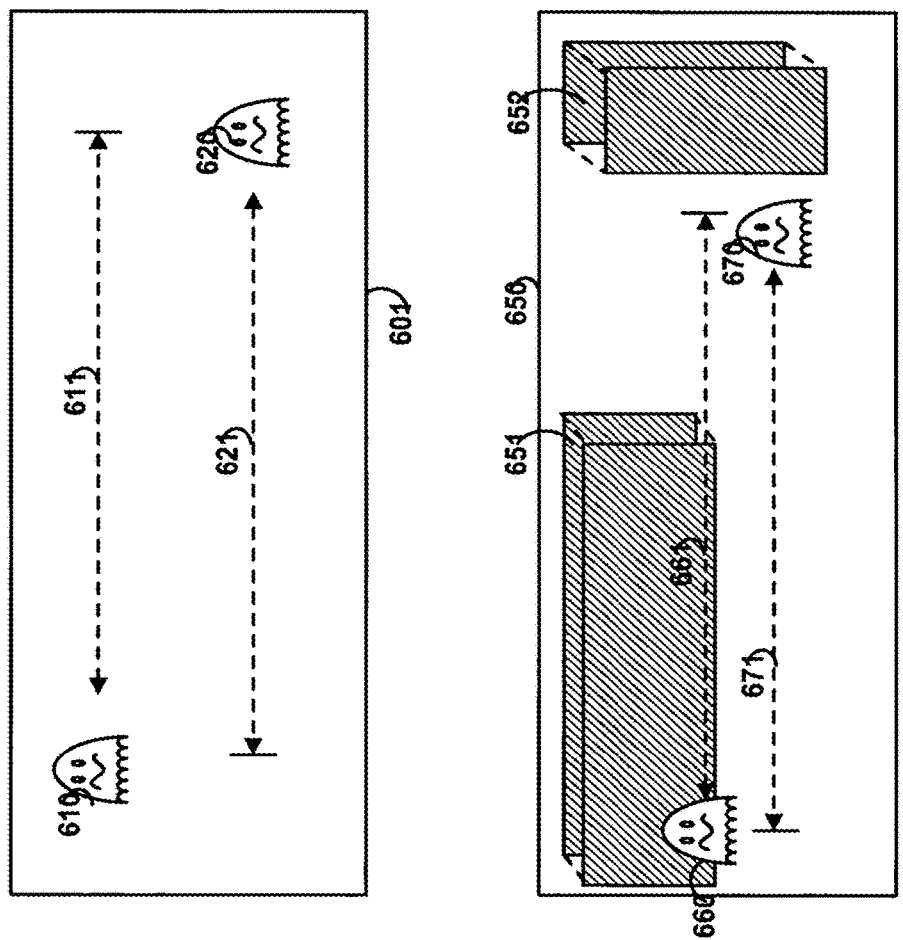
FIG. 6 is an illustration of computer-controlled character positioning and movement based on detected landscape objects constructed in accordance with the principles of the present invention.

FIG. 6 shows virtual character movement between environmental objects in environments 610 and 600. Persons skilled in the art will appreciate that environments of a figure (e.g., such as environments 610 and 600) may also be considered playfields (e.g., virtual game playfields) or may be virtual indicia (e.g., virtual game objects and characters) augmented over actual, physical environments. In environment 601, no environmental objects may be present. Therefore, logic may be provided such that virtual character 610 moves along path 611 while virtual character 620 moves along path 621. In environment 650, actual environmental object may be present and stored in memory as virtual objects 651 and 652. Alternatively, no actual environmental objects may have been scanned but virtual objects may otherwise be provided at the locations of virtual objects 651 and 652 (e.g., may be originally coded into a game's code or intelligently placed at the locations based on the actual environment). If the stored location of virtual objects 651 impedes on the planned movement of virtual characters, then program logic (e.g., game code) may manipulate the movement path of virtual characters around these virtual objects. If the movement path is dynamic (e.g., not laid out) then such virtual environment locations may not be "moved into" by a dynamic virtual character. Persons skilled in the art will appreciate that a number of intelligent placement features of virtual objects/characters may be provided. For example, a virtual object/character may be placed in the middle of a particular open space to maximize the change of the virtual object/character coming within a particular distance of a user (e.g., to maximize the virtual object/character's field of vision on the virtual playfield). Alternatively, virtual objects/characters may be played in locations determined to be strategically advantageous. For example, if there is only a single entrance to a playfield or playfield area (e.g., a doorway to a room) then virtual objects/characters can be spread about either behind virtual objects placed in the playfield (from the perspective someone standing in the door) or placed such that multiple objects/characters have different perspective angles to the door (e.g., such that virtual enemy soldiers can cover the doorway from different angles). Thus, cooperative defensive and offensive tactics may be used by the virtual game objects/characters.

Visibility of virtual objects/characters may be set and modified for a head-set augmented reality system. For example, a user may define a virtual visibility of 100 feet. Virtual barriers may then be provided (e.g., rendered and augmented on a display) at this proximity (or at predefined boundaries) to immerse the user in the augmented world. For example, if a child is playing in a city, then the visual barriers may take the form of fog and this may hide any skyscrapers that may take away from the believability of the augmented reality.

Figure 7:
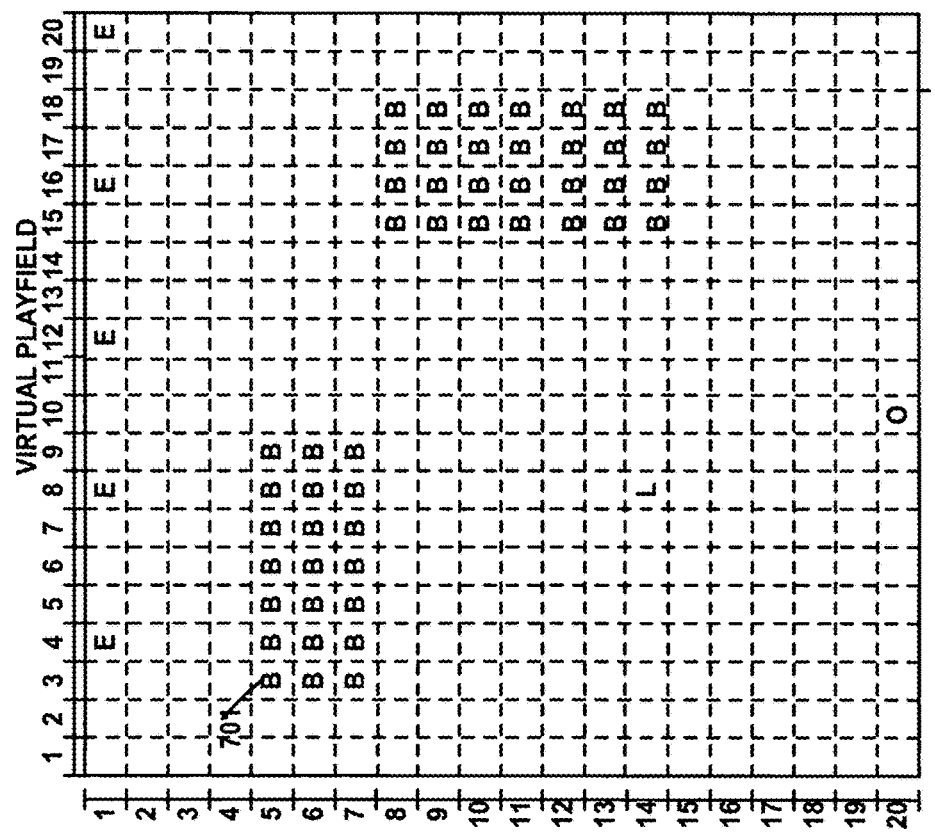
FIG. 7 is an illustration of virtual playfield mapping that includes physically detected impenetrable objects constructed in accordance with the principles of the present invention.

FIG. 7 shows a playfield data structure in which environmental object data 701 (e.g., barrier information data) may be stored. Such a playfield data structure may be used as the primary information structure for the game such that program logic refers to information in the playfield structure to determine game events (e.g., point scoring, deaths, level completions).

Figure 8:
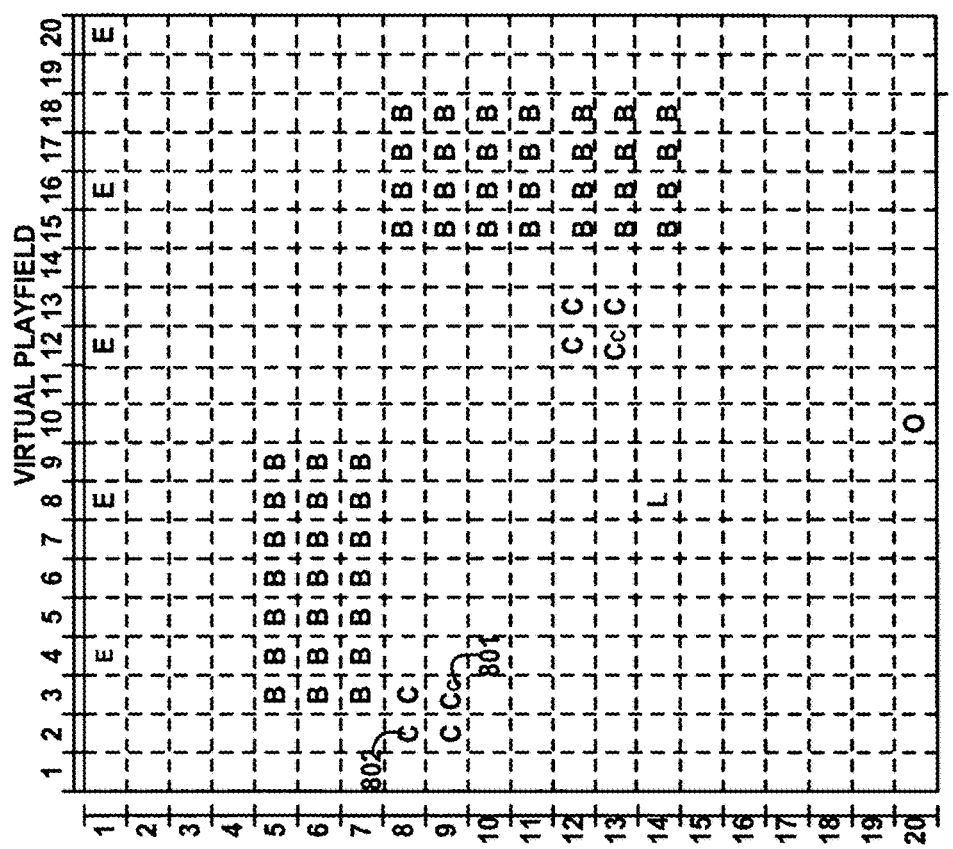
FIG. 8 is an illustration of computer controls for video game characters in a location-based game constructed in accordance with the principles of the present invention.

FIG. 8 shows expanded virtual character information (shows as information C 802 and information Cc 801) stored in a playfield data structure. If a character takes up more than one pixel (or more than one data block if data blocks are associated with size) then one of the data locations may be the controlling location Cc. Thus, program logic may just move the controlling character information data Cc and then this controlling character information may be utilized to generate surrounding character information (e.g., C). Any sort of character information may be associated to, for example, a control location or any character information. For example, the distance a computer-controlled virtual character can see (e.g., the distance at which the character can read information on a virtual playfield) can be associated to the control information (e.g., the control location) for that character. As per another example, the distance a character can use a particular attack (e.g., project a projective using sling-shot versus shooting a bullet out of a gun) can be related, in a game's code) the control information (e.g., the control location) for that character.

Figure 9:
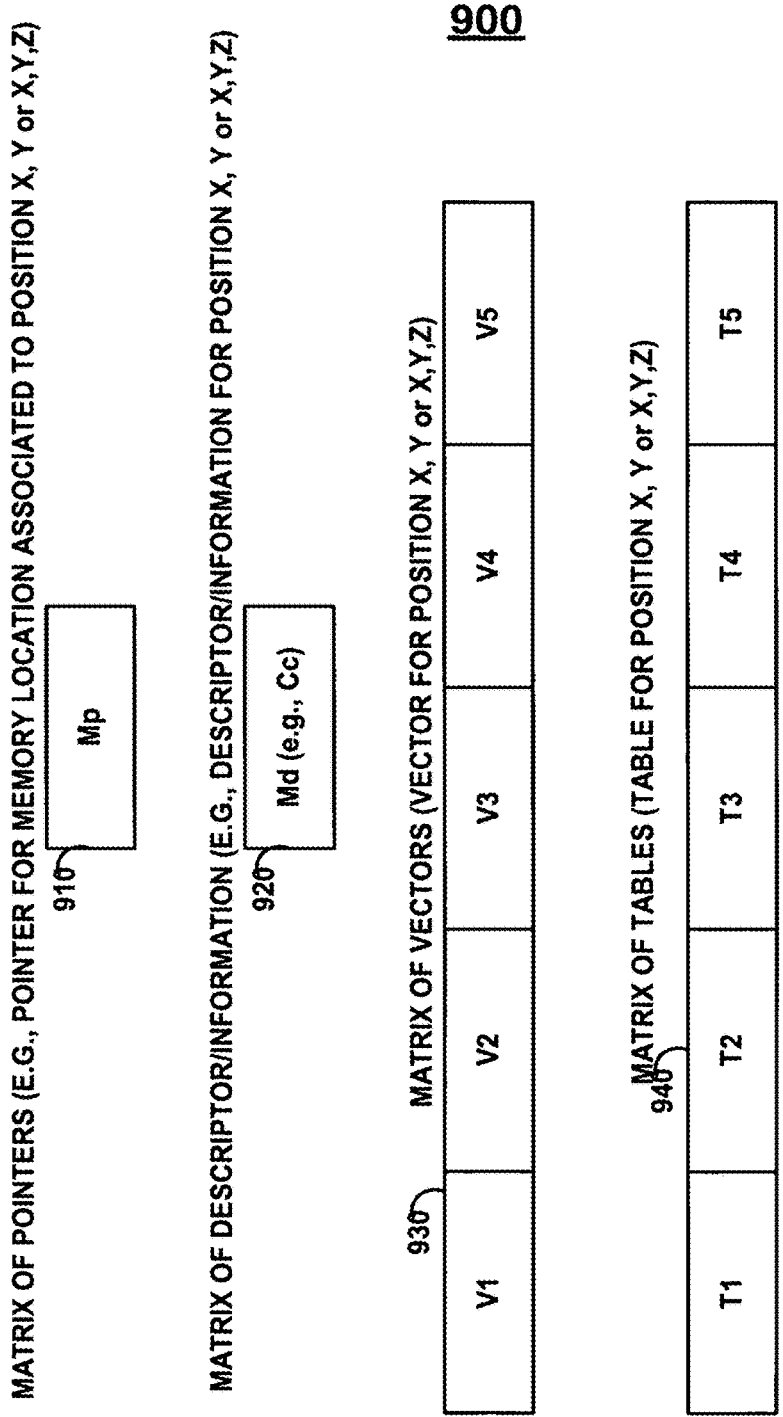
FIG. 9 is an illustration of different data storage structures for a location-based game constructed in accordance with the principles of the present invention.

FIG. 9 shows possible data structures that may be utilized for a playfield data structure. Matrix of pointers 910, matrix of descriptors 920, matrix of vectors 930, or matrix of tables/matrices 940 may be utilized. Matrix of pointers 910 may be, for example, pointers that point to memory locations in which a large amount of information is stored (e.g., in which a vector of information is stored). Matrix of descriptors 920 may be, for example, a matrix of the information needed for a particular playfield location. Matrix of vectors 930 may have one or more matrix locations associated to one or more playfield locations and may include complex information in any form (e.g., vector form or table form as shown in matrix of tables 940). Any data structures such as any type of database may be utilized or, alternatively, actions and information may be written as additional code into a games code or, alternatively still, used by a games code as code updates.

Figure 10:
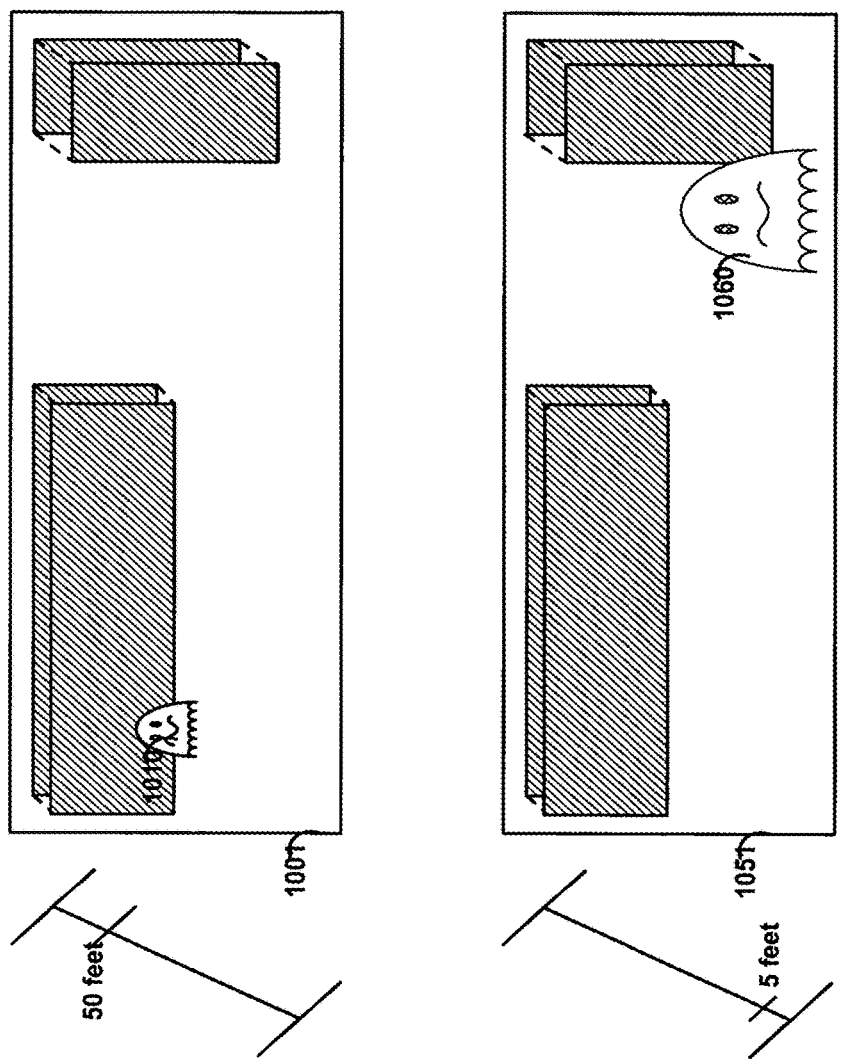
FIG. 10 is an illustration of displaying video game characters in a semi-visible display for a location-based game constructed in accordance with the principles of the present invention.

FIG. 10 shows virtual characters 1010 and 1060 generated on display screens 1001 and 1051. Depending on the distance of virtual characters (either controlled by an opponent or computer controlled) from the display (or locating device on the system), the size of virtual characters that are shown may be manipulated. In this manner, a user is provided augmented reality indicia that is scaled to the perspective of that user (e.g., height, pitch, roll, distance and location of the perspective). As such a true three-dimensional virtual object/character can be provided whose size scales according to the height, pitch, roll, distance, and location of the perspective to the virtual object/character (e.g., the perspective of a user).

Figure 11:
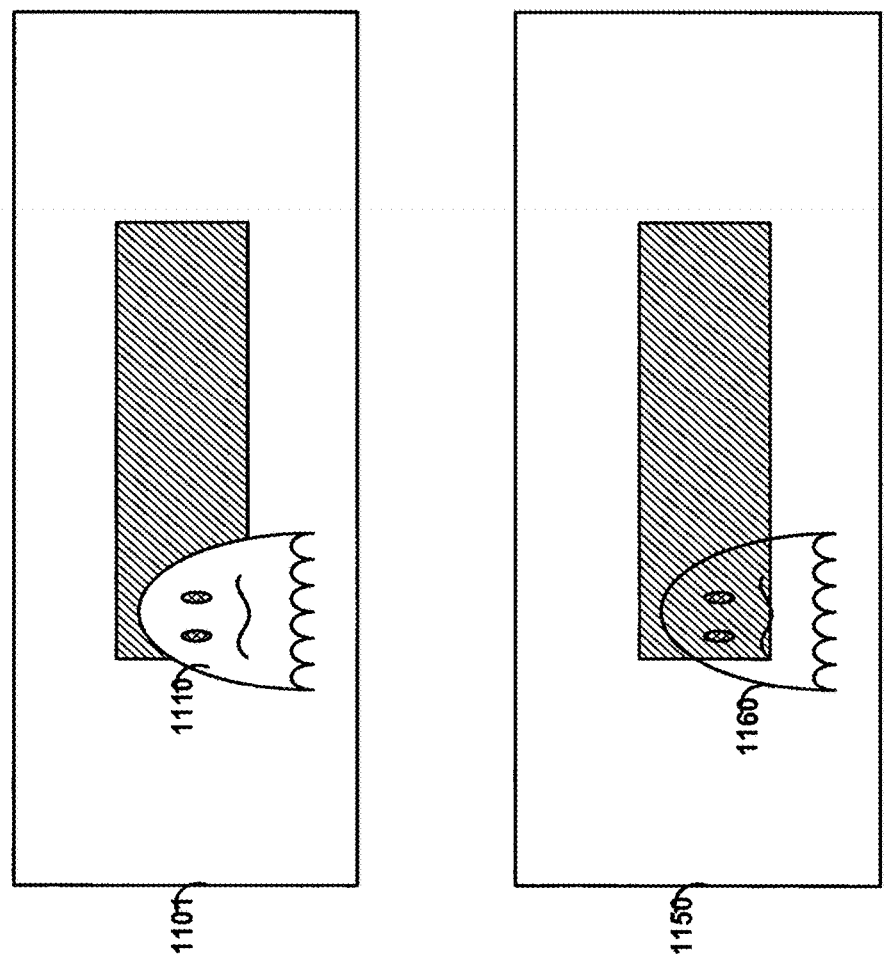
FIG. 11 is an illustration of displaying video game characters with different transparencies for a location-based game constructed in accordance with the principles of the present invention.

Logic may be included such that virtual characters (either controlled by an opponent or computer controlled) are transparent (e.g., virtual object/character 1160 of environment 1150 of FIG. 11) or non-transparent (e.g., virtual object/character 1110 of environment 1101 of FIG. 11). A user may be able to manually control the transparency or the contrast of indicia that is being displayed. Transparent objects may offer the additional functionality of making the environment safer to move in. For example, a user may trip over a rock if that user is in an "invincible mode" and runs through a virtual character and that character covers the rock by being non-transparent. A user is less likely to trip over a rock if that user can see the rock, in some form, through a character. The transparency of a character may also change depending on the user's distance from that character. For example, far-away characters may be semi-transparent (noting they can't interact with you yet such as they can't shoot you yet) while characters that you are sharing a location with are almost entirely-transparent. Persons skilled in the art will appreciate that the transparency of a virtual object may be changed by, for example, changing the number of pixels that define an image are displayed. The smaller amount of pixels that are used to depict a character that are used, the more transparent a character (or virtual object) may become.

Virtual characters (either opponent-controlled or computer controlled) may have certain functionalities that have certain functionality envelopes. For example, a virtual controlled character may have an interactive object like a weapon (e.g., a gun) that may shoot an interactive bullet over a particular distance. Such envelopes may take any form. For example, if a virtual character has a force field then the force field may be mapped around, for example, a controlling location a particular distance. Thus, an event may occur if a different character (such as a user-operated character) walks into this envelope (e.g., the user's health may decrease).

As illustrated in FIG. 1200, such envelopes may be utilized to determine how far a virtual character may see. For example, one character (e.g., information C1 1201) may only see in the direction that character is facing (e.g., information S1 1202). A second character may see in a particular direction around that character (e.g., information S2 1203). These envelopes may overlap (e.g., information S3 1204) such that if a user walks into S1, C1 can attack (or some other functionality may be utilized by the game). If a user walks into S2, C2 can attack (or some other functionality may be utilized by the game). If a user walks into S3, C1 and C2 can attack (or some other functionality may be utilized by the game).

Figure 13:
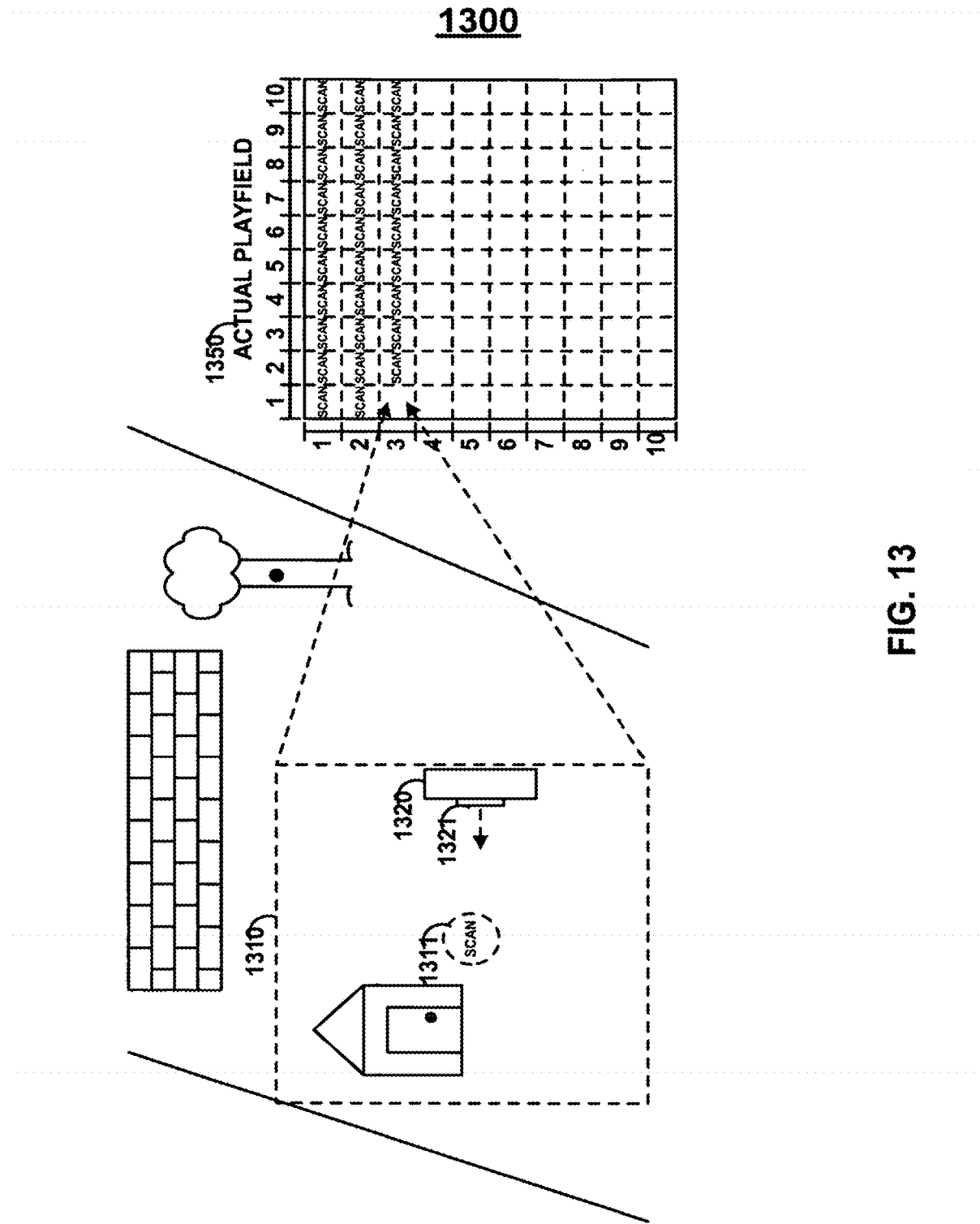
FIG. 13 is an illustration of pre-scanning a physical playfield constructed in accordance with the principles of the present invention.

FIG. 13 shows system 1300 in which sections of an actual playfield are scanned in before gameplay begins. Such scanning may be utilized from the perimeter of an area (or multiple perimeters). Alternatively, the game may be fabricated to utilize scanning from the center of an area and the user may be directed to rotate at a particular speed for a particular period of time (or until a particular number of rotations have occurred). Alternatively, a virtual configuration indicia (e.g., a virtual character) may be displayed on a display (e.g., a user's head-mounted display during set up). Manual controls may allow a user to change the location of the configuration indicia and acknowledge when desired configuration is obtained. Thus, a user may look at a particular portion of an actual playfield, move his/her head up and down, and continually change and acknowledge the location of the virtual indicia so that the virtual indicia is aligned with the landscape (e.g., is standing on the landscape). The game code (e.g., the code aligning the image on the display) may be dynamically updated such that as a user moves his/her head, the perspective to the virtual indicia changes and a user can change any misalignment that occurs at any perspective and such misalignment errors may be used to update the game's code (or rendering/alignment code). Manually entered acknowledgment information for alignment via manual controls may be utilized to generate a representation of the physical landscape a user is playing the game on. Thus, actual, physical environmental data can either be, for example, scanned by a location detector prior to a game (or during a game), built using a computer administration interface, or manually entered on the fly via configuration and acknowledgment controls.

Figure 14:
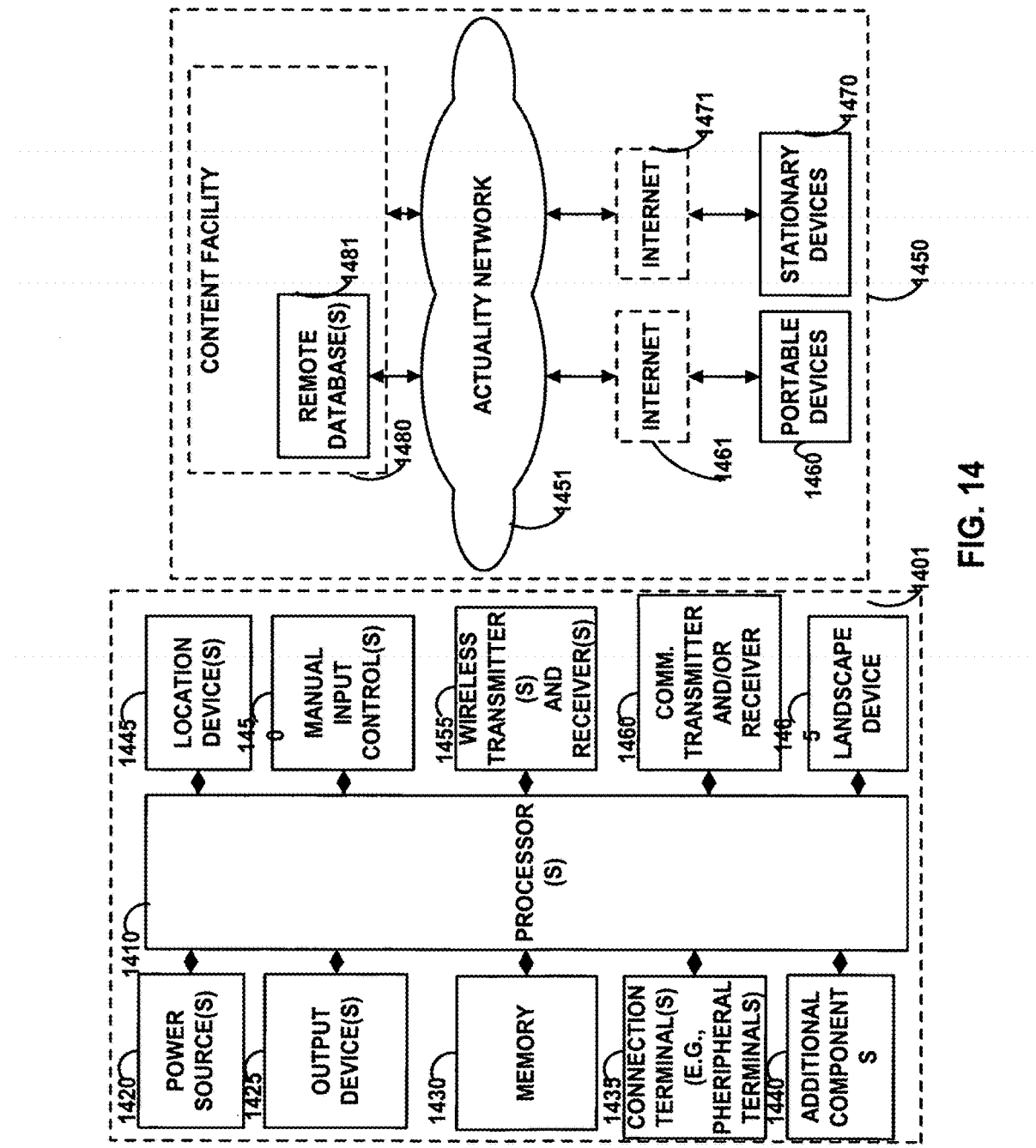
FIG. 14 is an illustration of a location-based game topology constructed in accordance with the principles of the present invention.

FIG. 14 shows game system 1401 and network topology 1450.

Game system 1401 may include, for example, any number of power sources 1420, output devices 1425, memory 1430, connection terminal (e.g., input, output interfaces) 1435, additional components 1440, location devices (e.g., GPS, LPS, accelerometers, gyroscopes, inertial movement sensors, hybrid location systems) 1445, manual input controls 1450, wireless transmitters and receivers 1455 and other communication transmitters and receivers (e.g., blue tooth, WiFi, wireless LAN, infrared, radio), landscape device 1465.

Topology 1450 may include remote facilities such as content or administrator facilities 1480 with intermediaries such as remote databases 1481 (or content providers), network 1451 (e.g., a wireless network such as a wireless LAN based network). Internet portals 1461 and 1471 may also be provided such that information may be published and downloaded from web-based game systems (e.g., via cellular phone game systems). Portable gaming devices 1460 (e.g., handheld device 100 of FIG. 1 or head-mounted device 452 of FIG. 2 or a cell phone) may be utilized as game systems. Alternatively, stationary devices (e.g., home game systems) may be utilized to generate virtual game characters on an augmented reality system. As mentioned, wireless phones may include location devices such that wireless phones may, for example, download program logic and be utilized a location-based game systems or as control devices for augmented reality game systems. Any third-party service may be utilized by an AR game system (or an AR wearable computer). For example, cell phone, or another wireless communication service, may be provided to an AR device. Location security services (e.g., permission control services or encryption/compression services) may also be utilized by an AR system.

Persons skilled in the art will also appreciate that the present invention is not limited to only the embodiments described. Instead, the present invention more generally involves providing location-based games and AR systems. Persons skilled in the art will also appreciate that the apparatus of the present invention may be implemented in other ways then those described herein. For example, the AR capabilities may be utilized for AR advertising in which advertisement signs are provided outside of certain locations (e.g., outside a GPS signal that denotes you are near a GAP clothing store). Such an advertisement may be positioned, for example, based on a landscape detector, perspective determining devices, or particular locations. All such modifications are within the scope of the present invention, which is limited only by the claims that follow.

What is claimed is:

1. A non-transitory computer-readable medium with stored program logic thereon, when executed by a processor, cause the processor to perform the method comprising:
    providing 3-D video game indicia to a head-mounted display of a head-mounted device with respect to a physical playfield based on video game logic associated with a video game, wherein said head-mounted device includes a processor;
    utilizing a detector to determine landscape characteristics of said physical playfield, wherein said video game logic utilizes said landscape characteristics in providing said video game; and
    utilizing a locating device to determine the physical location of said locating device on said physical playfield, wherein said video game logic utilizes the physical location of said locating device in providing said video game.

2. The non-transitory computer-readable medium of claim 1, further comprising utilizing a wireless communications service.

3. The non-transitory computer-readable medium of claim 1, further comprising utilizing a cell phone service.

4. The non-transitory computer-readable medium of claim 1, further comprising utilizing manual input controls.

5. The non-transitory computer-readable medium of claim 1, further comprising utilizing a WiFi receiver.

6. The non-transitory computer-readable medium of claim 1, further comprising utilizing a blue tooth receiver.

7. The non-transitory computer-readable medium of claim 1, further comprising utilizing a radio receiver.

8. The non-transitory computer-readable medium of claim 1, further comprising utilizing an infrared receiver.

9. The non-transitory computer-readable medium of claim 1, further comprising utilizing a remote database.

10. The non-transitory computer-readable medium of claim 1, further comprising utilizing a remote database through a network.

11. The non-transitory computer-readable medium of claim 1, further comprising determining a pitch of said head-mounted display.

12. The non-transitory computer-readable medium of claim 1, further comprising determining a pitch of said head-mounted display and determining a roll of said head-mounted display.

13. The non-transitory computer-readable medium of claim 1, further comprising determining a pitch of said head-mounted display, determining a roll of said head-mounted display, and determining a height of said head-mounted display.

14. The non-transitory computer-readable medium of claim 1, further comprising utilizing a source of power, a memory, a peripheral terminal, a wireless receiver, and manual input controls.

15. The non-transitory computer-readable medium of claim 1, further comprising utilizing a peripheral terminal.

16. The non-transitory computer-readable medium of claim 1, further comprising utilizing a source of power and a peripheral terminal.

17. The non-transitory computer-readable medium of claim 1, further comprising utilizing a parental control to limit video game types allowed to be accessed by said system.

18. The non-transitory computer-readable medium of claim 1, wherein a virtual currency system is associated with said video game.

19. The non-transitory computer-readable medium of claim 1, wherein a paid advertising is provided in said video game.

20. The non-transitory computer-readable medium of claim 1, further comprising utilizing manual controls, wherein a pitch of said head-mounted display is determined and a roll of said head-mounted display is determined.

* * * * *

Disclaimer

10,179,277 B2 - Jeffrey David Mullen, Pittsburgh, PA (US). LOCATION-BASED GAMES AND AUGMENTED REALITY SYSTEMS. Patent dated January 15, 2019. Disclaimer filed October 30, 2025, by the assignee, Mullen Industries LLC.

I hereby disclaim the following complete Claims 1, 8, 13, and 20 of said patent.

*(Official Gazette, January 20, 2026)*